(12) United States Patent
McKnight et al.

(10) Patent No.: US 6,670,974 B1
(45) Date of Patent: Dec. 30, 2003

(54) PERSISTENT USAGE CONTEXT

(75) Inventors: Russell F. McKnight, Sioux City, IA (US); Glen J. Anderson, Sioux City, IA (US); Joseph G. Richard, Sioux City, IA (US); Michael J. Calvillo, Sioux City, IA (US); Stephen P. Vossler, Sioux Falls, SD (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/415,656

(22) Filed: Oct. 12, 1999

(51) Int. Cl.[7] ................................................ G09G 5/00
(52) U.S. Cl. ........................ 345/855; 345/738; 345/835
(58) Field of Search ................................. 345/738, 739, 345/853, 854, 855, 835

(56) References Cited

U.S. PATENT DOCUMENTS

| 5,442,778 A | 8/1995 | Pedersen et al. ............ 395/600 |
| 5,544,303 A | 8/1996 | Maroteaux et al. ......... 395/161 |
| 5,708,780 A | 1/1998 | Levergood et al. ..... 395/200.12 |
| 5,721,897 A | 2/1998 | Rubinstein ................... 395/602 |
| 5,727,129 A | 3/1998 | Barrett et al. ................. 395/12 |
| 5,809,250 A | 9/1998 | Kisor ..................... 395/200.57 |
| 5,864,863 A | 1/1999 | Burrows ..................... 707/103 |
| 5,878,433 A | 3/1999 | Miyamoto ................... 707/103 |
| 5,884,316 A | 3/1999 | Bernstein et al. ........... 707/103 |
| 6,243,091 B1 * | 6/2001 | Berstis ......................... 345/839 |

* cited by examiner

Primary Examiner—Ba Huynh
(74) Attorney, Agent, or Firm—Scott Charles Richardson; Suiter-West

(57) ABSTRACT

A system and method for generating a persistent usage context is disclosed. In an exemplary embodiment, a method of generating a persistent usage context includes monitoring usage of an information handling system and generating a first representation corresponding to a first item of usage and a second representation corresponding to at least one of the first item of usage and a second item of usage. The first representation and second representation are communicated so as to communicate an association of the first representation to the second representation and to enable a determination of at least one of the prior usage and current usage of an information handling system.

49 Claims, 17 Drawing Sheets

PERSISTENT USAGE CONTEXT

FIELD OF THE INVENTION

The present invention generally relates to the field of monitoring and access of the utilization of programs and devices as pertaining to information handling systems, and particularly to the use, manipulation, and access of representations of prior and current usage.

BACKGROUND OF THE INVENTION

Today, users of information handling systems have access to a wide range of resources. For example, faster processors and expanded memory enable a user to operate more than one program at a time, as well as connect an increasingly greater variety of devices to the information handling system, such as printers, modems, touch pads, write pads, voice recognition devices, satellite information, network access, etc. The variety and sheer number of available devices and resources connected to even one system may make tracking the performance and utilization of these resources near impossible, especially if the system is connected to a network. A user operating a typical information handling system may generally determine which programs are currently operating, but may not determine how they are operating, which tasks are being performed, or the utilization by the program of devices connected to the system. Additionally, a user may not have a clear idea of the past usage of the system. Errors may occur as a result of a downloaded document, incomplete installation, or malfunctioning device. Without the ability to view past usage and the association of various programs utilized, a user must merely guess at the cause of the problem.

In some instances even when the past usage of a resource is stored, the user may not determine the association of the resources. For example, a web browser may save accessed web sites saved in a history section displayed in alphabetical order relating to a specified unit of time. These saved histories are capable of accessing the previous item stored on the system or connecting through an active connection to access the resource, such as a web page. However, even though the relationship of a web page may be displayed as it pertains to the specific site, the association of the web pages to each other may not be shown. For instance, a user may determine that a particular site was accessed during a particular time and that a particular page is a component of a particular site, but the user may not determine the association of the sites with each other, such as the order the sites were accessed, the organization structure of the sites, how the sites were accessed, etc. Secondly, a user may not apply this information to other actions taken on an information handling system, such as the utilization of devices, programs, etc.

Furthermore, current usage of a system is typically stored in a chronological fashion. For example, sites visited by a user during a browsing session are typically listed in the order accessed. If a user accesses an initial site, then a second site, and then accesses the initial site again, the history is shown as initial site, second site, initial site. In other instances, a history of the current browsing session may merely show repeated accessing of the main site, even though pages within the site were accessed. Therefore, it may be advantageous to show prior access of resources and utilization of an information handling system by a user in organizational scheme so the association of the resources, devices, etc. may be communicated.

Additionally, users of current web browsers and operating systems may utilize navigation controls to navigate through sites and windows that were previously accessed by the user. However, once a user exits the program or terminates the system, this data is lost. For example, a user must then either try to remember the address to the desired site or save desired sites and pages as a "bookmark" or on a list of "favorites" to access the site after termination of the browsing session. Therefore, it may be advantageous to save navigation histories so as to be accessed later by a user to enable the utilization of the navigation history by the navigation functions included in the information handling system.

Therefore there is a need for a system and method for persistent usage context of an information handling system.

SUMMARY OF THE INVENTION

The present invention is directed to a system and method for generating a persistent usage context. In an exemplary embodiment, a method of generating a persistent usage context includes monitoring usage of an information handling system and generating a first representation corresponding to a first item of usage and a second representation corresponding to at least one of the first item of usage and a second item of usage. The first representation and second representation are communicated so as to communicate an association of the first representation to the second representation and to enable a determination of at least one of the prior usage and current usage of an information handling system.

In another exemplary embodiment, a user may determine the current and prior usage of an information handling system both locally on the information handling system and over a network as well as determine the utilization of a plurality of information handling systems. By utilizing representations depicting current and prior items of usage, such as the operation of a word processor, spread sheet, email, device, etc., a user may view activities performed on the system as well as the association of the activities. In this manner, a user may determine which programs are currently operating, which tasks are being performed, and the utilization by the program of devices connected to the system. This may also enable a user to determine the source of problems which occurred on the system by viewing a usage history of tasks and actions performed by the system. Furthermore, in another embodiment a user may access information and actual tasks and programs utilized by the system by utilizing the representation.

In a further exemplary embodiment, representations may be displayed in an organizational scheme. In one example, representations depicting the usage history of an information handling system may be communicated so as to disclose the association of the resources as utilized by the user.

In an additional exemplary embodiment, the present invention is directed to a system and method wherein a persistent usage context, for instance navigation in a web browsing session, operating system, etc. may be stored. The method of generating a persistent usage context includes monitoring the navigation of a resource during a first navigation session to obtain navigation data and storing navigation data pertaining to the first navigation session. Then, the method involves initiating a second navigation session of at least one of the first resource and a second resource and loading stored data in at least one of the first resource and the second resource so as to enable the utilization of stored first navigation data during the second navigation session. For example, this may enable a user to store web browsing contexts for later use even after the web browsing session has terminated. In a preferred embodiment, saved usage contexts may be stored and selectively accessed on a user's information handling system. In another embodiment, the persistent usage context may act to load previously accessed sites into a user's web browser to enable the user to utilize the forward and backward buttons as if the web session were still active.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the present invention, examples of which are illustrated in the accompanying drawings.

Referring generally now to FIGS. 1–16, a persistent usage context may be utilized in an exemplary embodiment of the present invention to communicate both prior and current usage of an information handling system. Usage for an entire information handling system, including the utilization of programs, operating systems, devices coupled internally, peripherally and over a network, a plurality of information handling systems, network applications, etc. may be communicated by utilizing the present invention. In one embodiment usage may be displayed as representations, such as icons, thumbnails, etc. that correspond to an item of usage. Associations of the items of usage may be communicated through a variety of ways, including spatial relationships, temporal relationships, arrows, organizational schemes, etc. In this way, the present invention may overcome the limitations of an alphabetical listing of previously accessed resources and the mere display of resources in a nested format.

Figure 1:
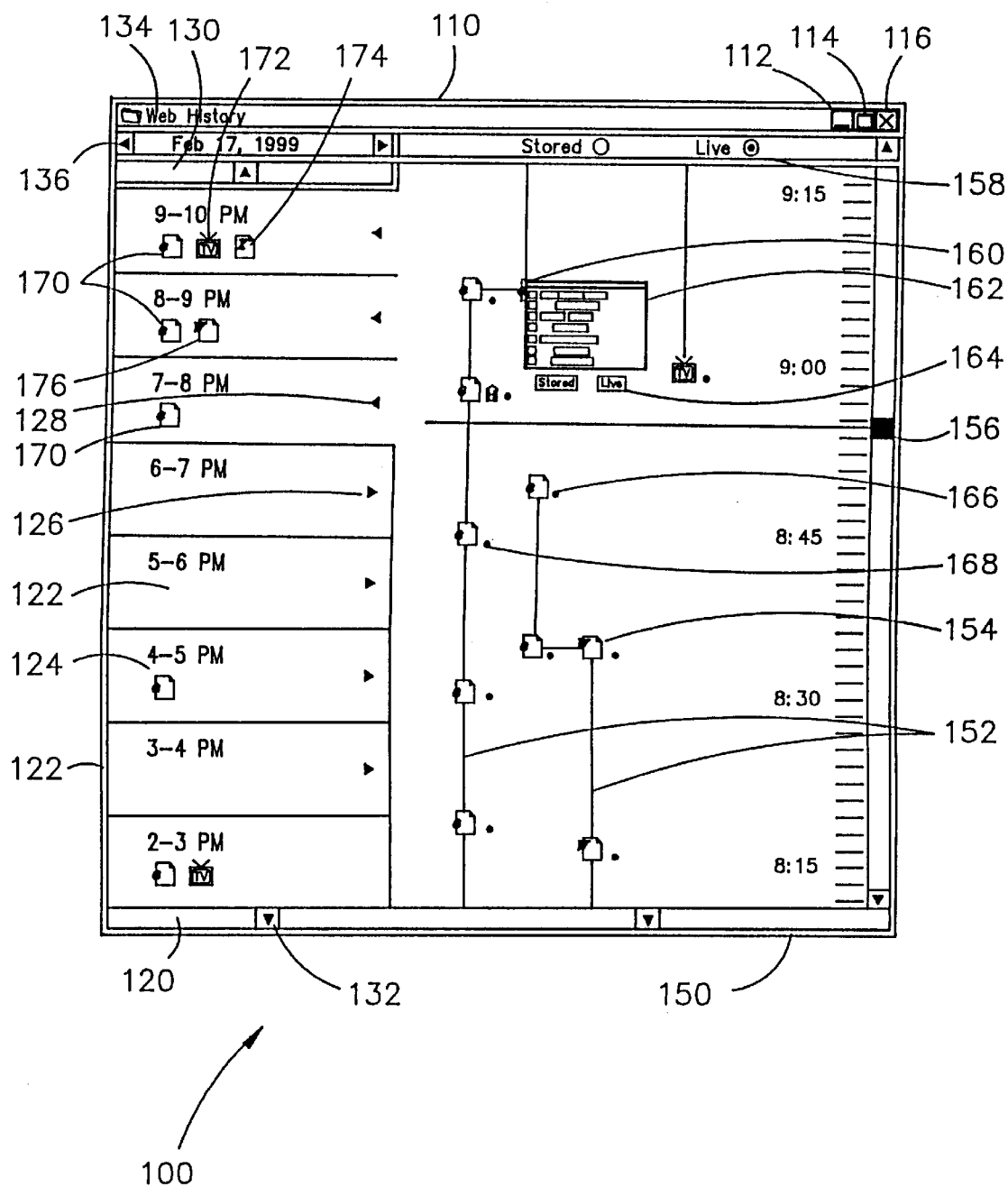
FIG. 1 is an illustration depicting an exemplary embodiment of the present invention wherein a persistent usage context communicates representations corresponding to items of usage in chronological order.

Referring now to FIG. 1, an exemplary embodiment of the present invention is shown wherein a usage history is communicated in a chronological order. A persistent usage context 100 may utilize a window 110 that may appear on a display of an information handling system. The persistent usage context 100 may be implemented under an operating system such as Windows® 98. The window 110 may have standard controls for maximizing 112, minimizing 114, and closing 116 the window 110. A range of time 120 may be displayed in an area of the window 110. The time range 120 may include boxes for displaying intervals 122 of the time range. Within each time interval 122, representations 124, in this instance shown as icons, may be displayed to show which type of resource was utilized by the system during the time interval 122. Time intervals 122 may also include controls for adding 126 and removing 128 representations to and from a detailed description area 150. The time range 120 portion of the window 110 may also include controls for scrolling up 130 and down 132 the time range. This may allow a user to scroll through many time intervals 122 of the time range 120. Additionally, the time range 120 portion of the window 110 may include a date indicator 134 with scrolling controls 136 to have information from various dates appear in the time range 120.

A detailed description area 150 may be included to communicate present and historical usage information. In an exemplary embodiment, the detailed description area 150 may include an association depicted as a line of representations 152 for each instance of utilization of a resource, such as a word processor, email program, etc. Furthermore, associations including multiple representation lines 152 may be displayed for communicating information regarding the utilization of multiple resources by an information handling system, network of information handling systems, etc. A representation 154 may be displayed for individual resources or media pieces, such as documents generated from a word processor, spread sheets, email messages, etc. A selector control 156 may be utilized to allow a user to choose a particular time. For example, a selector control 156 may slide up and down a window 110 to allow a user to select the full viewing context as it existed at that time. Additionally, a default load control 158 may be utilized to set the default load, such as live or stored. For example, a user may access a live version of the utilization, such as a web page over the Internet or a stored version contained on the user's system. In a preferred embodiment, a user moving a cursor over a representation 160 may access a view of the usage. For example, a user moving a cursor over a representation 160 of a web page may view a thumbnail picture 162 of the page and controls 164 to allow opening of the page from a live or stored source. Additionally, it may be preferable to utilize indicators to signify if a resource is available 166 or not available 168. Indicators may include displaying an "A" if available and an "N/A" if not available, using colored dots such as green for available and red for not available, etc.

An exemplary method for the utilization of the present invention as shown in FIG. 1 will now be discussed. A user has accessed the details of the utilization of an information handling system on February 17 between 7 and 10 PM. The time intervals between 7 PM to 10 PM include one television show 172, three web pages 170, a word document 176, and an excel document 174. In this example, the excel document 174 has been toggled off so as not to be displayed in the detailed description area 150. It may be preferable to display a representation that has been toggled off by darkening the representation, shadowing the representation, etc. In this instance, a user has moved a cursor over a web page representation 160 to display a thumbnail 162 of the resource. The user may also access a representation, such as right clicking a mouse while the cursor is located proximally to the representation, and select properties to see a window to show detailed information about the resource.

Figure 2:
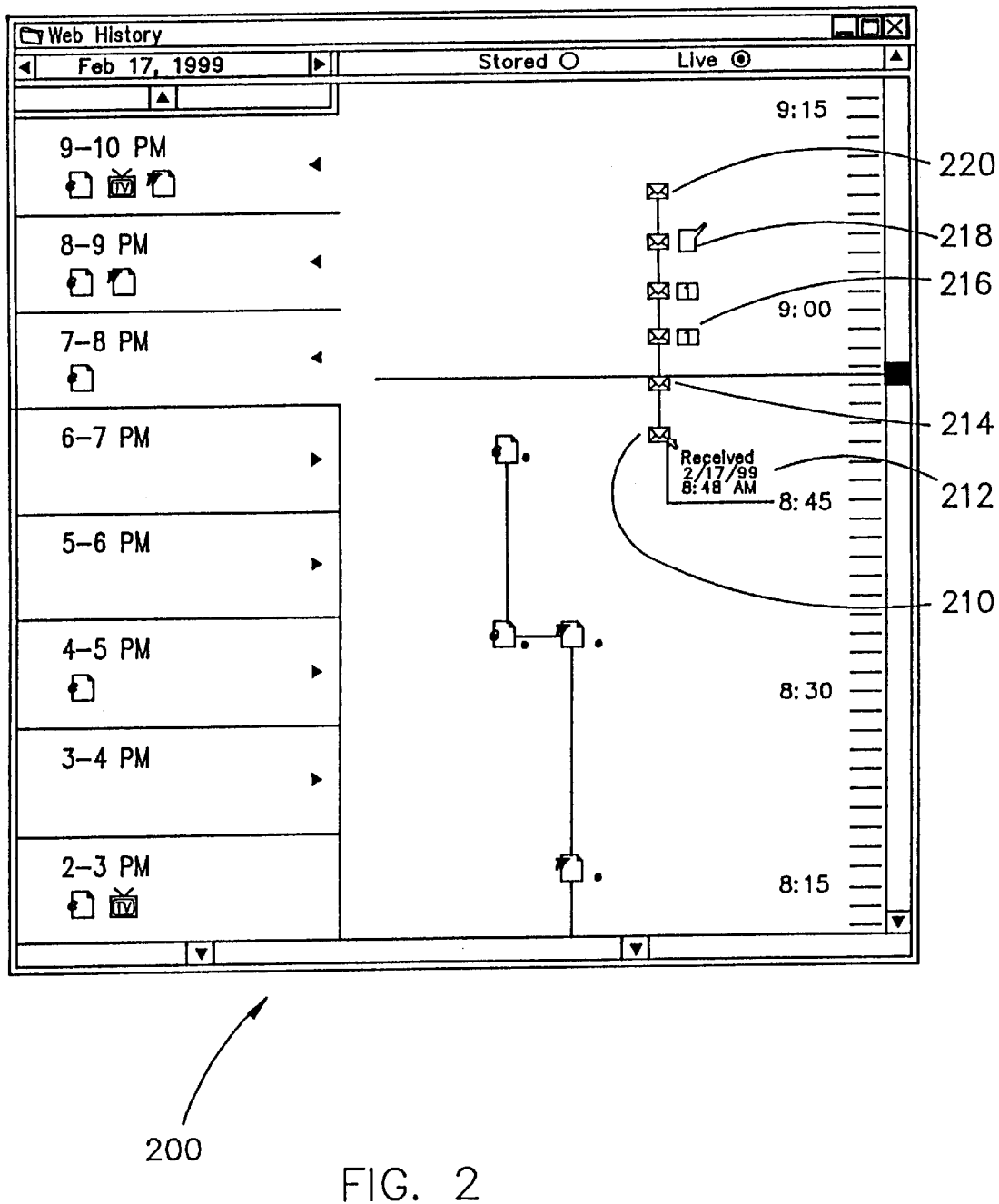
FIG. 2 is an illustration depicting an exemplary embodiment of the present invention as depicted in FIG. 1 wherein representations of items of usage including email usage are shown.

Referring now to FIG. 2, a persistent usage context 200 wherein email representations 210 as utilized by the present invention are shown. A cursor disposed proximally to the email representation 210 may enable a graphic 212 to display relevant information about the representation 210. In this instance, the graphic 212 may display when email was received. A representation may include another representation indicating that the event represented is the reception of an email 214. Other representations may be generated to indicate more specifically the utilization of the system, such as a book icon 214 indicating that an email was viewed at that point in time, a pad and pencil icon 218 indicating that an email was composed, and an arrow pointing away from the email icon 220, indicating that an email was sent, etc. Therefore, a user utilizing this exemplary embodiment may determine not only which general resource was utilized, but also the specific actions performed in that resource as well as the relevant associations. Furthermore, the actions and resource are displayed in a user friendly manner to enable quick viewing.

Figure 3:
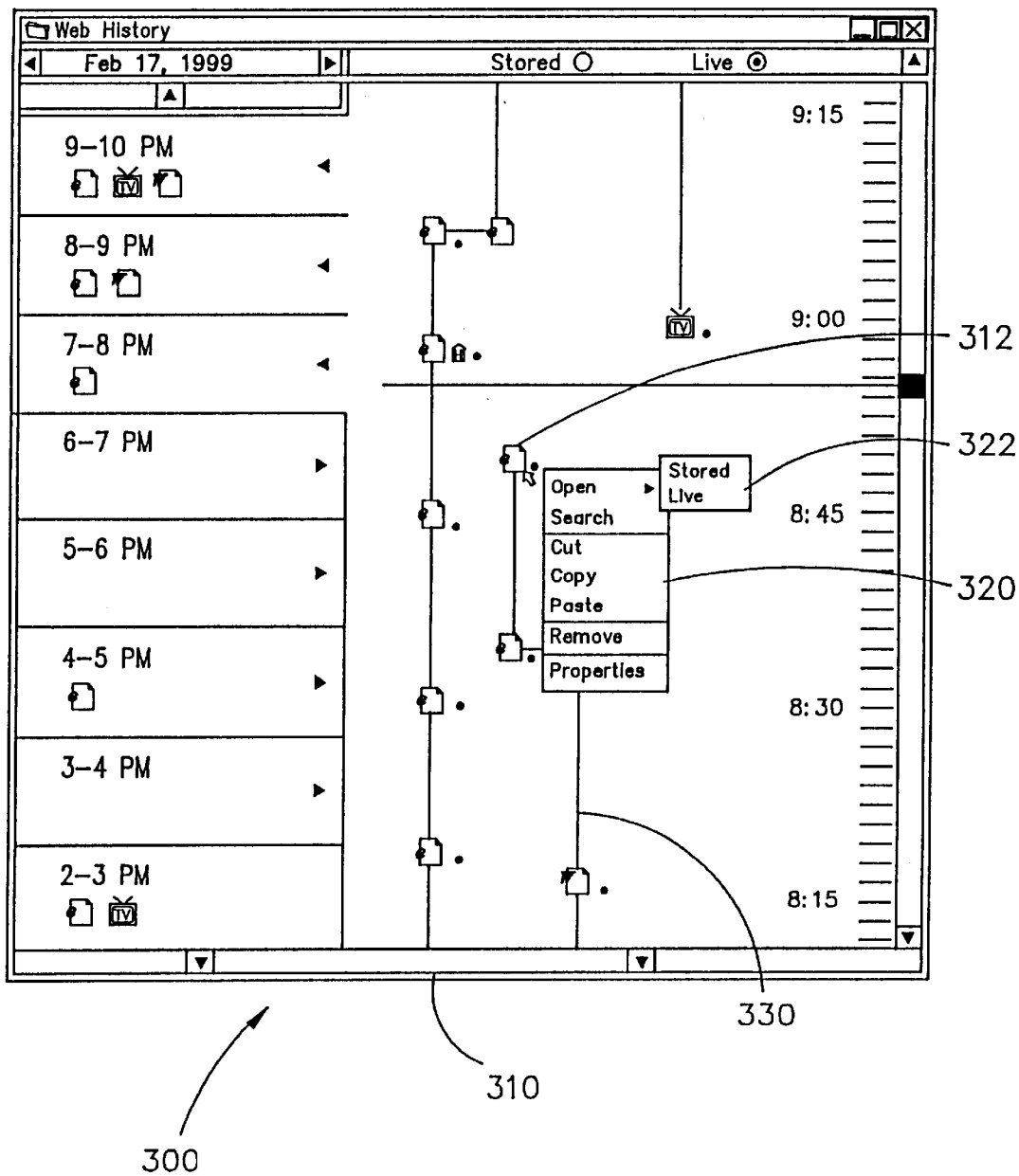
FIG. 3 is an illustration depicting an exemplary embodiment of the present invention as shown in FIG. 1, wherein a representation may be accessed by right clicking a mouse while a cursor is disposed proximally to a representation to access information and properties corresponding to the representation.

As shown in FIG. 3, a user may access a representation to perform a variety of actions. In this embodiment, a user may view a persistent usage context 300 in a window 310 displayed on an information handling system. The persistent usage context 300 may be implemented under an operating system such as Windows® 98. A user may access information contained in a representation 312 by moving a cursor over the representation, right-clicking a mouse when a cursor is disposed proximally to the representation, etc. A menu may be displayed, in this instance a pop-up menu 320, to communicate relevant actions, options, and information that may be relevant to the representation 312. In this instance, the menu 320 includes an "open" element. The open element may contain a submenu 322 to enable a user to choose between the latest stored version of the resource or the live resource. For example, a user may determine whether to access a stored version of a web page or access a "live" version through a network connection. A search function may be included in the menu to enable a user to search for a particular representation, time of utilization, particular resource, action performed, device utilization, etc. Other traditional actions may be accessed from the menu 320. For example, cut, copy, and paste may function similarly to the standard in the Windows operating system. Cutting a representation from an association, such as a line of representations 330, may break the association into two branches. Pasting a representation may start a new branch depicting an association and involve making a copy of the document within the history. This may be useful is a user desires to access and change a particular usage item but wishes an undisturbed copy of the usage item to remain on the system. A remove function may also be included on the menu 320 to remove a representation from display in the detailed description portion 150 (FIG. 1) of the window 310. It may be preferable to retain the underlying item of usage by not deleting the item from the system when it is removed. Furthermore, a properties function may be included in the menu 320 to launch a properties view of the given item of usage.

Figure 4:
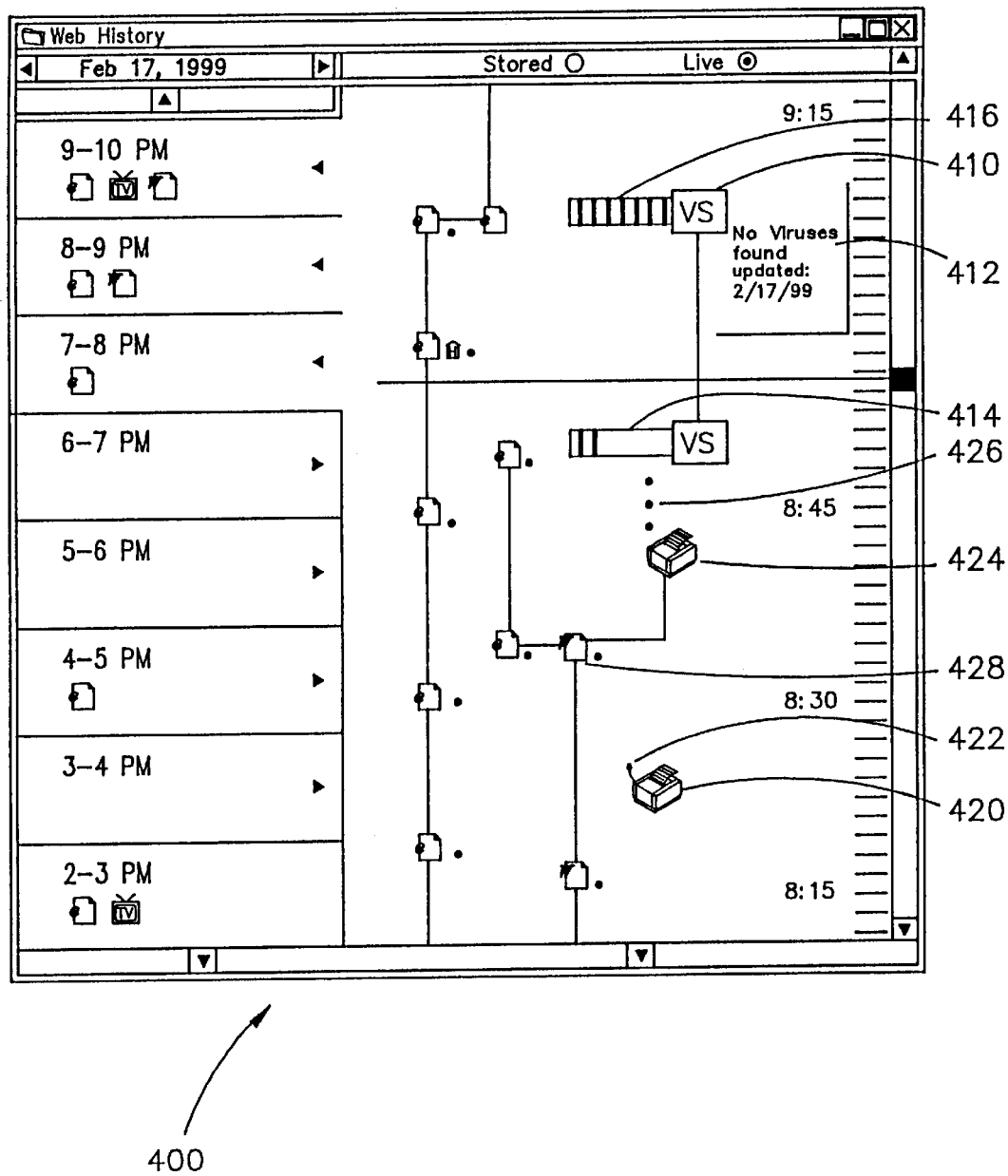
FIG. 4 is an illustration depicting an exemplary embodiment of the present invention as shown in FIG. 1, wherein an association including the utilization of devices and time required to perform an item of usage is communicated utilizing representations.

The persistent usage context may also be utilized to communicate the status and time required for an action performed by an information handling system, as shown in FIG. 4. In this embodiment, a resource, such as an anti-virus application, may be utilized to perform a virus scan of an information handling system. A representation of the anti-virus application 410 may be displayed in the persistent usage context 400. A status bar representation 414 may be included to indicate the start of the scanning process. Once the virus scan is completed, an additional status bar representation 416 may be displayed next to the anti-virus application representation 410 to indicate the completion of the task. Furthermore, a pop-up menu 412 may be utilized to communication information pertaining to the performed task, in this instance that no viruses were found.

A persistent usage context may also be utilized to communicate usage of devices, as shown in FIG. 4. In this exemplary embodiment, a persistent usage context 400 may communicate information pertaining to devices connected to an information handling system, in this instance a printer. A representation of a printer 420 may be utilized to communicate the availability of a printer to the system. Additionally, a plug representation 422 may be utilized in conjunction with the printer representation 420 to depict the connection of the printer to the information handling system. A variety of actions and functions may be communicated in a similar manner, such as communicating with devices over a network. Furthermore, representations may be utilized to communicate the actual utilization of a device, as well as the association of the device with a resource. For example, a printer may receive a printing job from a word processing program. By utilizing a printer representation 424 in conjunction with a representation depicting the processing of the print request 426, the persistent usage context may display the time taken to process the request and from where the request was received 428. It may be useful to enable a user to access the printer representation 424 to show the status of the print request. Therefore a user may be able to determine the current usage of an information handling system. It may also be useful to employ the present invention over a network so all devices connected to the network may be communicated and represented by the present invention. Additionally, the present invention may be employed by a server so as to monitor and display activity over a network.

Figure 5:
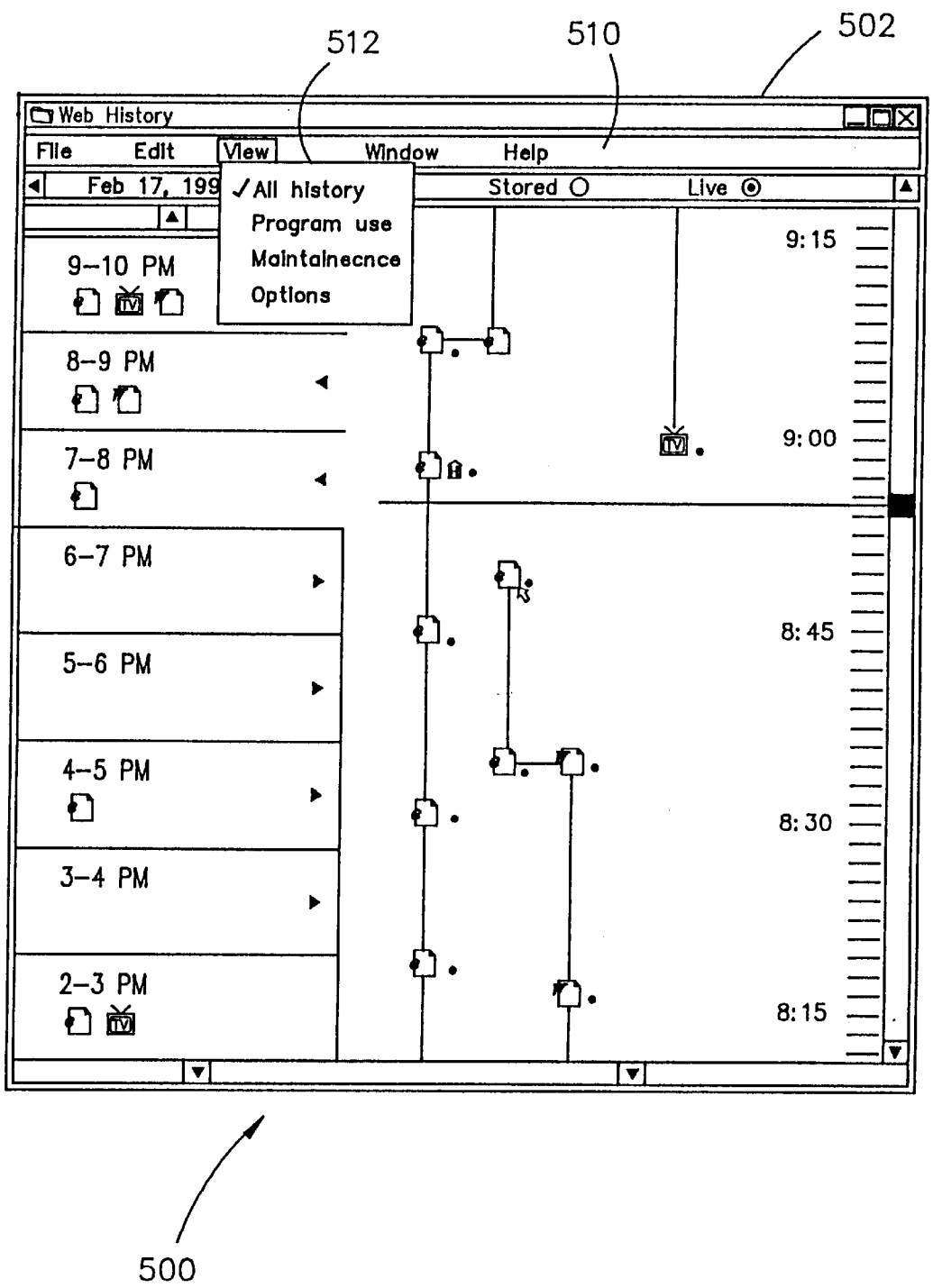
FIG. 5 is an illustration depicting an additional exemplary embodiment of the present invention wherein a menu bar containing a view menu is shown.

A variety of menus may be utilized by the present invention to enable a user to access functions that may prove useful in the framework of a persistent usage context. One such function may be incorporated in the view menu, an example of which is shown in FIG. 5. In this embodiment, a menu bar 510 may be located at the top of a window 502 in a persistent usage context 500. A view function 512 may be located in the menu bar 510 to provide a variety of functions related to the viewing of the persistent usage context 500. For example, a user may elect to display only a program usage history, and even further limit the view to productivity applications, entertainment applications, etc. In another example, a user, such as technical personnel, may wish to show only maintenance activity such as installed hardware and software, virus scans, etc. It may also be preferable to enable a user to change default setting, such as color, size of the detailed description window 150 and time range window 120 (FIG. 1), font type, time intervals displayed, format of the association of representations, such as chronological, organizational, linear, tree format, spatial, etc.

Figure 6:
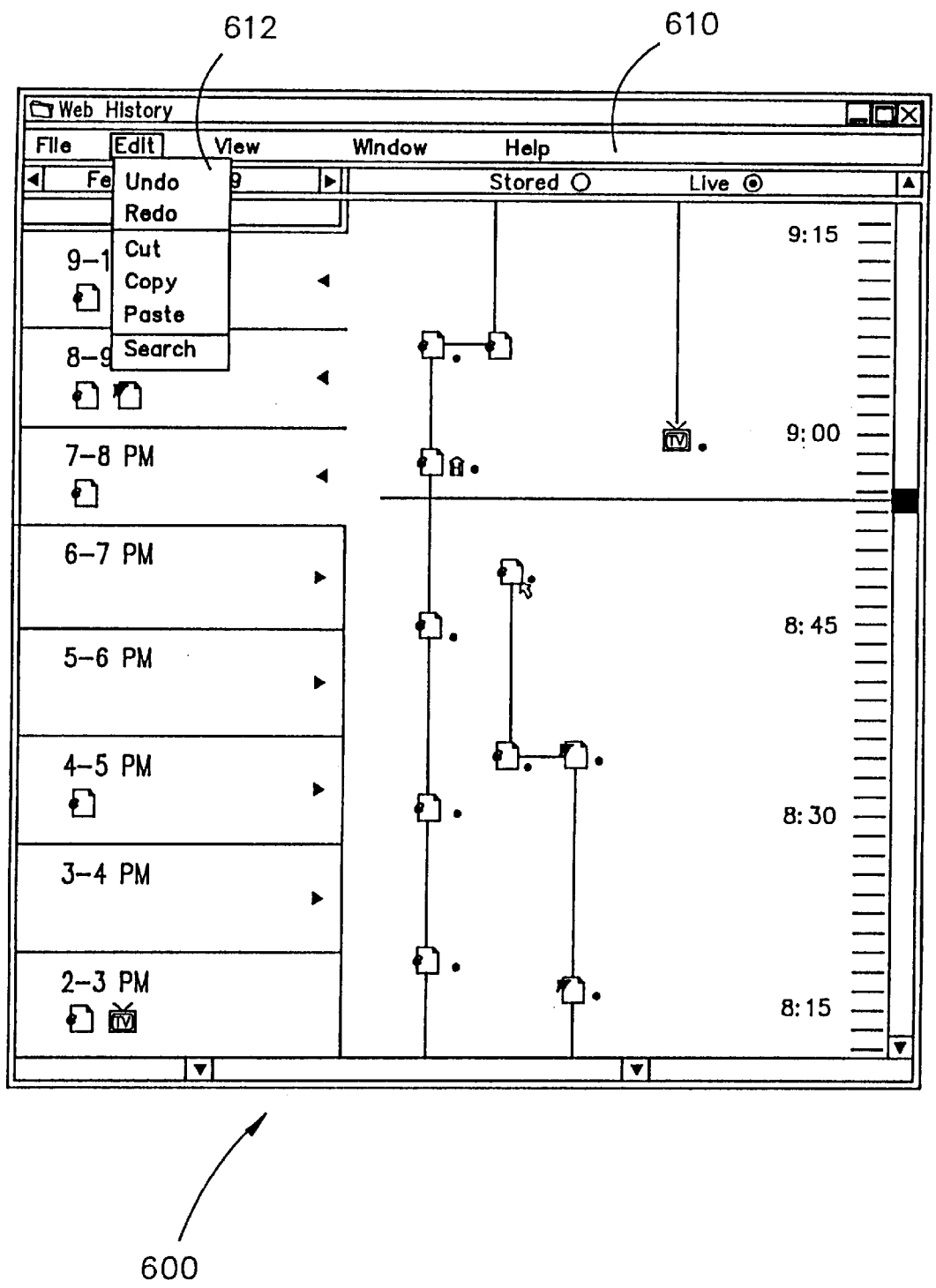
FIG. 6 is an illustration depicting an exemplary embodiment of the present invention as shown in FIG. 5 wherein a menu bar containing an edit menu is shown.

An additional menu that may be utilized in an exemplary embodiment of the present invention is the edit menu. As shown in FIG. 6, an edit menu 612 may be contained in a menu bar 610 of a persistent usage context 600. The edit menu may contain standard edit functions, such as undo, redo, cut, copy, and paste, as described earlier. Furthermore, the edit menu may contain access to a search function to locate specific items of usage and representations contained in the persistent usage context 600.

Figure 7:
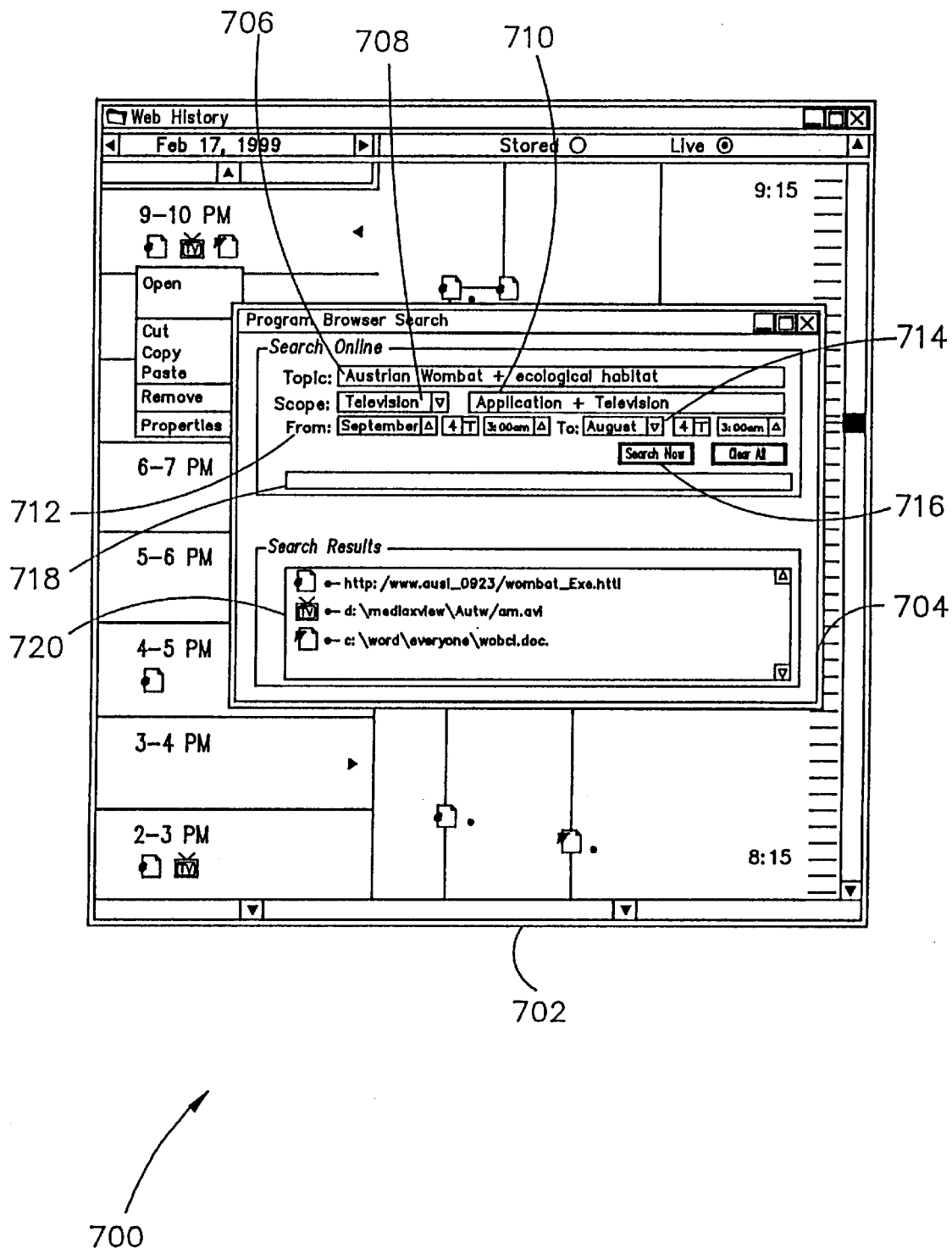
FIG. 7 is an illustration depicting an exemplary embodiment of the present invention as shown in FIG. 1 wherein a search function including exemplary searchable criteria is shown.

Referring now to FIG. 7, an exemplary embodiment of a persistent usage context 700 employing a search function is shown. In this example, a persistent usage context 700 utilizes a window 702 to display representations of items of usage. A search function displayed in a separate window 704 may be employed to communicate relevant data qualifying under a variety of elements. For example, a search may be performed by topic 706 of interest based on established structured query language (SQL) rules. Additionally, a user may define the scope 708 of the search function. For example, a drop-down list may be utilized to list forms of searchable media, such as by device (hard drive, compact disk read only memory, digital versatile disk, television, etc.), application, resource type, etc. The scope of the search may include multiple items listed in the scope function 708 that are then displayed 710 to the user. It may be useful to include temporal constraints on the search. For example, a user may specify beginning 712 and ending 714 dates and times to narrow the search. Furthermore, additional fields such as year and a list broken out by a specified amount of time, for example the last 7 days, last 24 hours, etc. may enable a user to customize a search request. Once the user completes the desired fields, the user may initiate the search by clicking a displayed button 716. It may be desirable to include a progress bar 718 to inform the user of the status of the search request. The results of the search may be displayed 720 so a user may access the results directly from search window 704. Results may be displayed with corresponding representations to enable a user to determine relevant usage data immediately from the search window 704. For example, a user may "click on" a representation from the results window 720 to directly access the corresponding item of usage. It may also be preferable to search based on the representation utilized. Such a search may include custom fields implemented and modified by a user. For example, a user may wish to add fields and data to a representation. By allowing a user to search this additional information, a user may further customize a search request.

Figure 8:
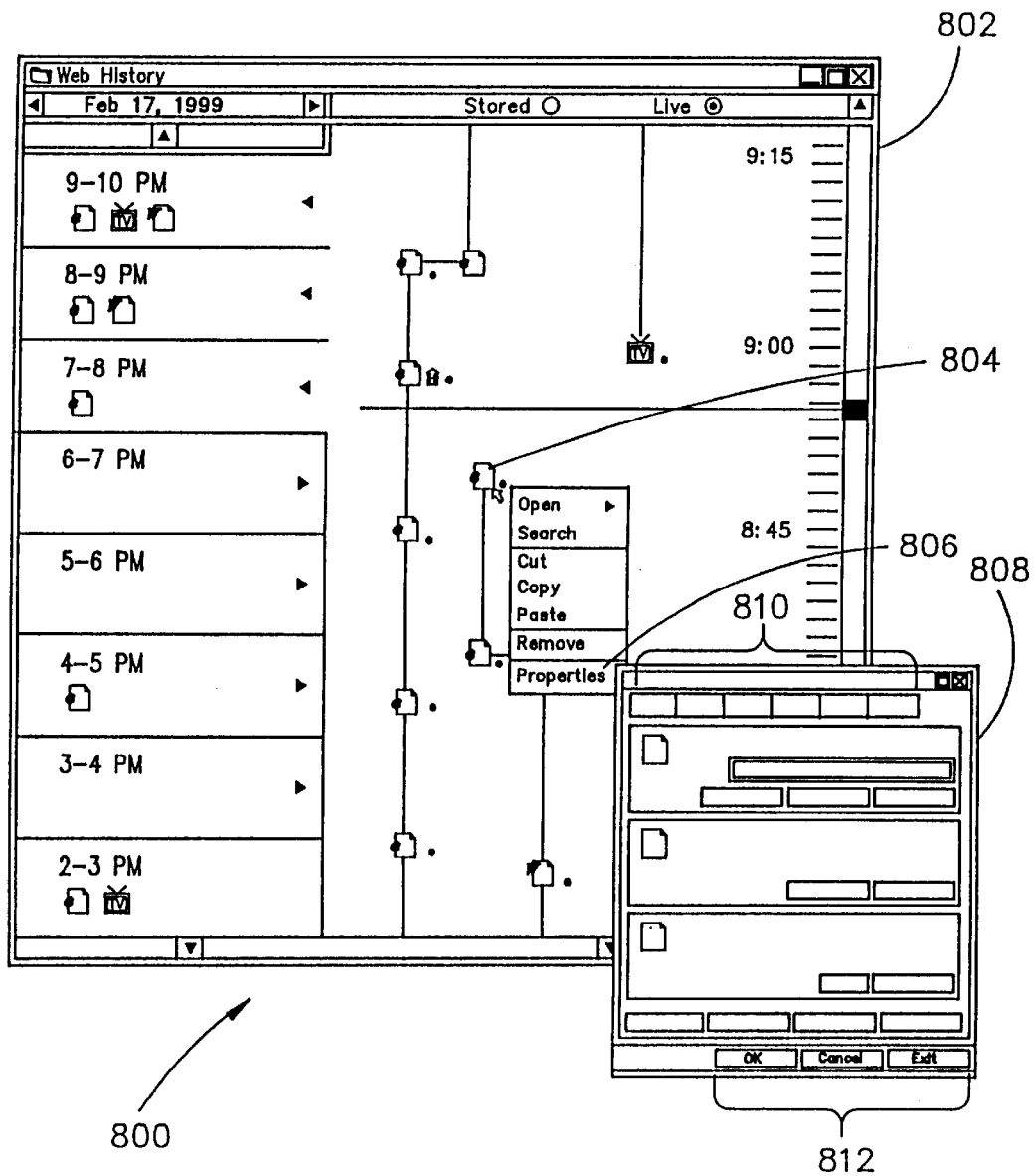
FIG. 8 is an illustration depicting an exemplary embodiment of the present invention as shown in FIG. 1 wherein a property function capable of being displayed as a pop-up menu is shown.

Referring now to FIG. 8, an exemplary embodiment of a persistent usage context 800 including a properties function is shown. In this example, a persistent usage context 800 utilizes a window 802 to display representations 804 of items of usage. A properties function may be initiated by "right clicking" a mouse while the cursor is disposed proximally to the representation 804 to display a pop-up menu containing the properties function 806, may be contained in a menu bar, etc. to display a properties window 808. It may be preferable to include a variety of properties 810 such as general, security, content, connections, programs, and advanced under the properties menu. A user may choose the desired property relevant to the particular representation and corresponding item of usage by utilizing this method.

Figure 9:
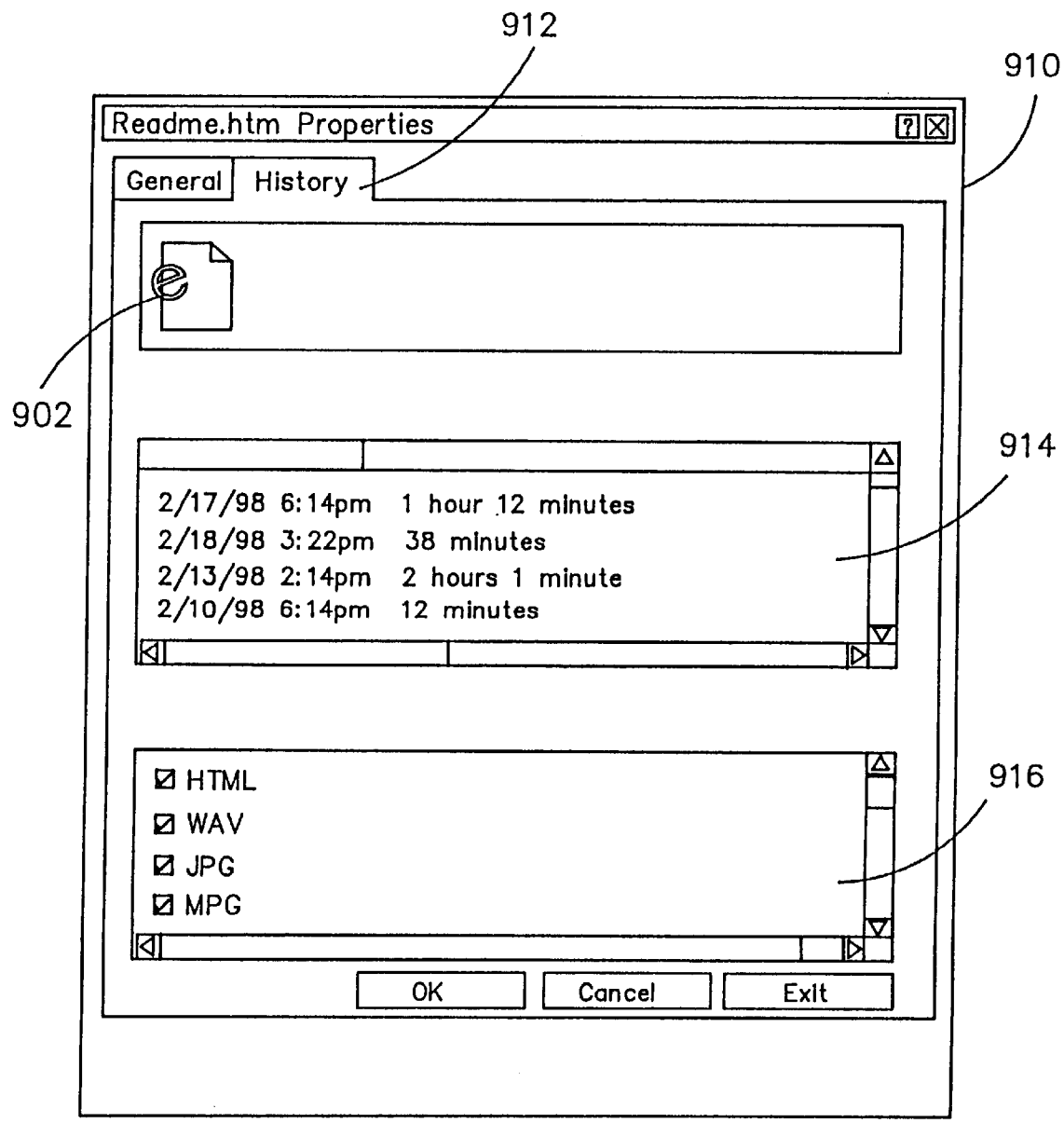
FIG. 9 is an illustration depicting an additional exemplary embodiment of the present invention as shown in FIG. 8 wherein an exemplary property function window is shown.

An additional exemplary embodiment of a properties window included in a persistent usage context is shown in FIG. 9. In this exemplary embodiment, a user may view particular properties relevant to a representation and corresponding item of usage. A properties window 910 may display a history of use for a corresponding representation 902. In this instance, the usage history is included as a tab 912 in the properties window 910. The usage history may include a list 914 of the utilization of the item of usage and the time utilized. Furthermore, a list of data types 916 may be included to display which types of data are contained in the item of usage.

Figure 10:
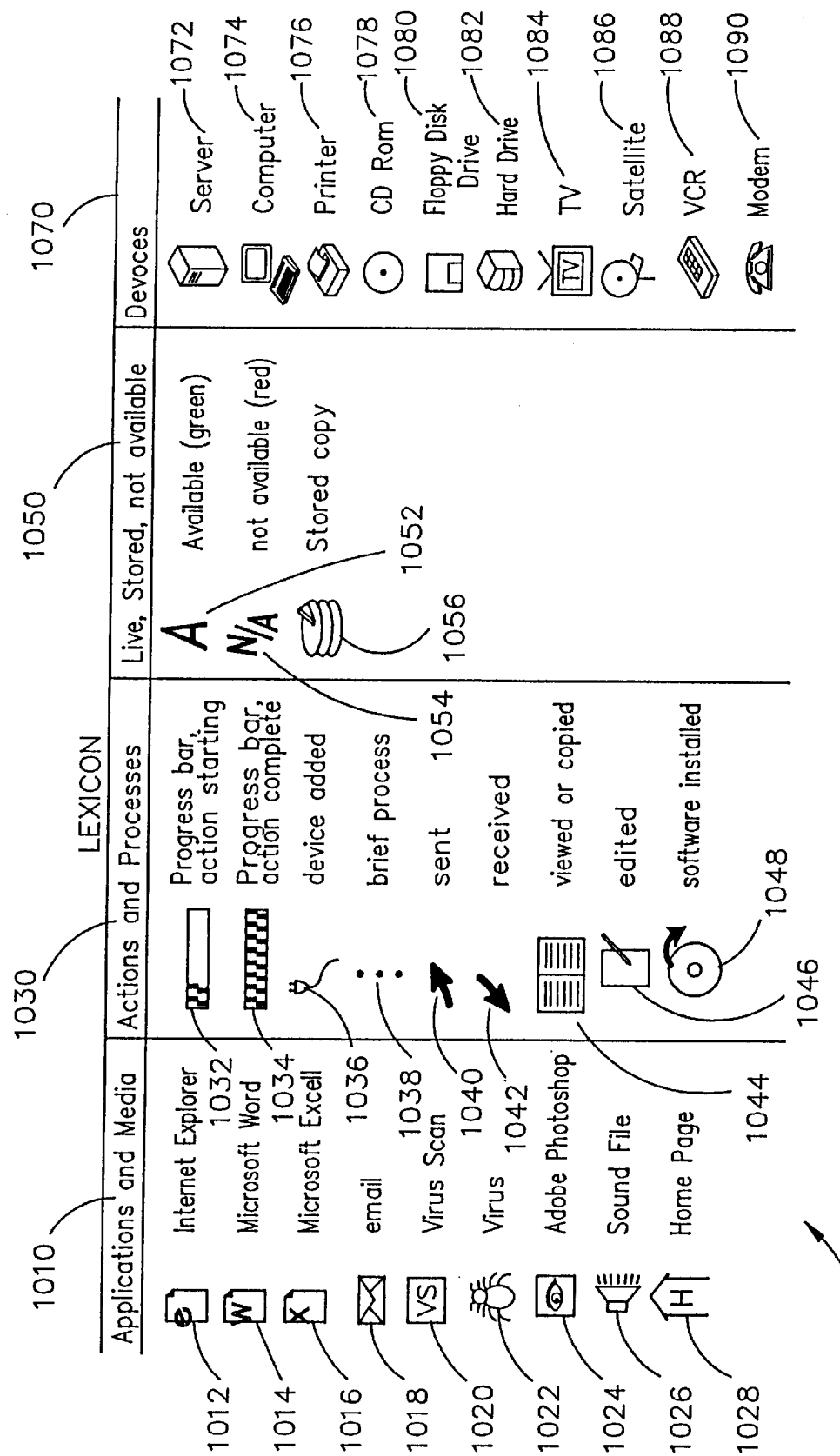
FIG. 10 is an illustration depicting an exemplary embodiment of the present invention wherein a lexicon of representations is shown.

Representations may be generated to indicate an item of usage and the source of the item of usage to which it pertains, examples of which are shown in FIG. 10. In this exemplary illustration, a lexicon 1000 of exemplary representations is shown. Representations may indicate the applications and media 1010 to which they pertain. For example, representations for Microsoft® Internet Explorer® 1012, Microsoft® Word® 1014, Microsoft® Excel® 1016, email 1018, a virus scan 1020, virus 1022, Adobe® Photoshop® 1024, sound file 1026, home page 1028 or any other application may be generated to correlate to the relevant item of usage. Representations may be created from icons used to traditionally depict the program in a graphic user interface (GUI) or any other method used to generate a representation such as a thumbnail of a web site, etc.

Additionally, representations of actions and processes 1030 may be generated to indicate performance of a task by the item of usage. For example, representations may be used to indicate the progress of a task, such as when an action starts 1032 and stops 1034. Additional examples include representations depicting when a device is added 1036, a brief process being performed 1038, sending or transmitting data 1040, receiving data 1042, viewing an item of usage 1044, editing an item of usage 1046, installing software 1048, etc. to show actions performed by an item of usage. Furthermore, the availability of the item of usage 1050 may be indicated by the use of a representation. For example, the availability of a web page from a stored source on an information handling system or a live connection over a network may be indicated with a representation showing availability, such as an "A" 1052 or a green dot, or showing that the item of usage is not available, such as an "N/A" 1054 or a red dot. Additionally, if the source of the item of usage is stored on an information handling system, server, etc. a stored copy representation may be utilized 1056. Likewise, representations for devices 1070 may be utilized by the present invention to indicate the usage of a device in conjunction with an item of usage, such as printing a document from a word processor, or items of usage pertaining to the device itself. For example, a server 1072, computer 1074, printer 1076, compact disk read only memory (CD ROM) 1078, floppy disk drive 1080, hard drive 1082, television 1084, satellite system 1086, video cassette recorder 1088, modem 1090, etc. may be represented to indicate usage of a device and how that usage is associated with available resources.

Figure 11:
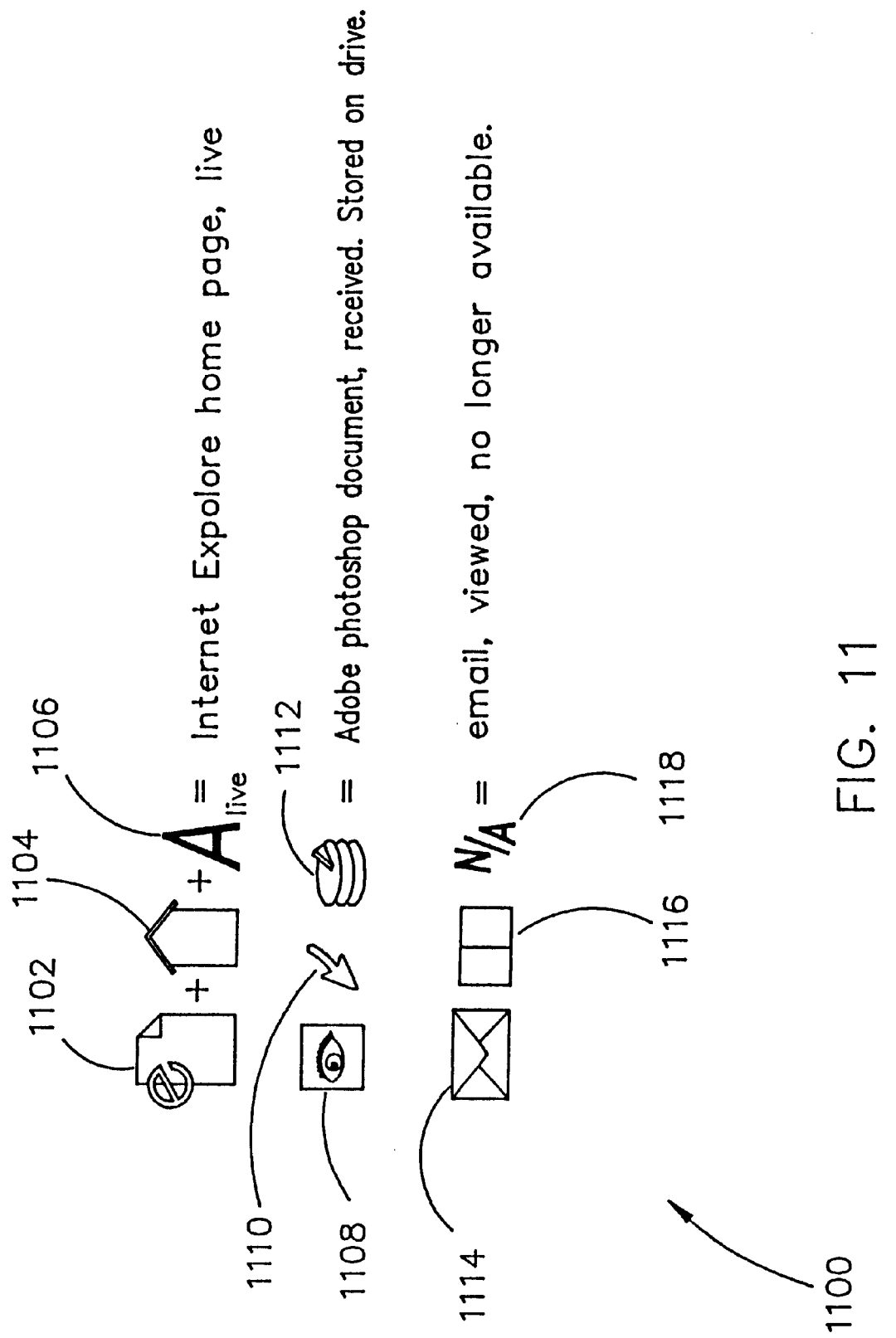
FIG. 11 is an illustration depicting an exemplary embodiment of the present invention as shown in FIG. 10 wherein a combination of representations may be displayed.

Representations may be combined to further indicate the performance of an item of usage. As shown in FIG. 11, representations in an exemplary embodiment of a persistent usage context 1100 are shown combined to more completely describe an item of usage. For example, a Microsoft® Internet Explorers representation 1102 may be used to indicate browsing the World Wide Web, that this particular web page is a home page 1104, and that the item of usage if available live 1106, such as through a network connection, modem connection, etc. Therefore a user may be able to determine that a web page utilized during a browsing session is available live. In another example, a user may have received an Adobes Photoshop® image and stored it on a hard drive. Therefore, representations may be generated indicating an Adobe® Photoshop® image 1108, received 1110, and then stored on a drive 1112. In yet another example, a user may view a previously received email that is no longer available to be utilized. Therefore, an email representation 1114 indicating that the email was viewed 1116 but that it is no longer available 1118 may be generated. An almost endless variety of combinations of representations may be generated and utilized by the present invention by a person of ordinary skill in the art and not depart from the spirit and scope of the present invention.

Figure 12:
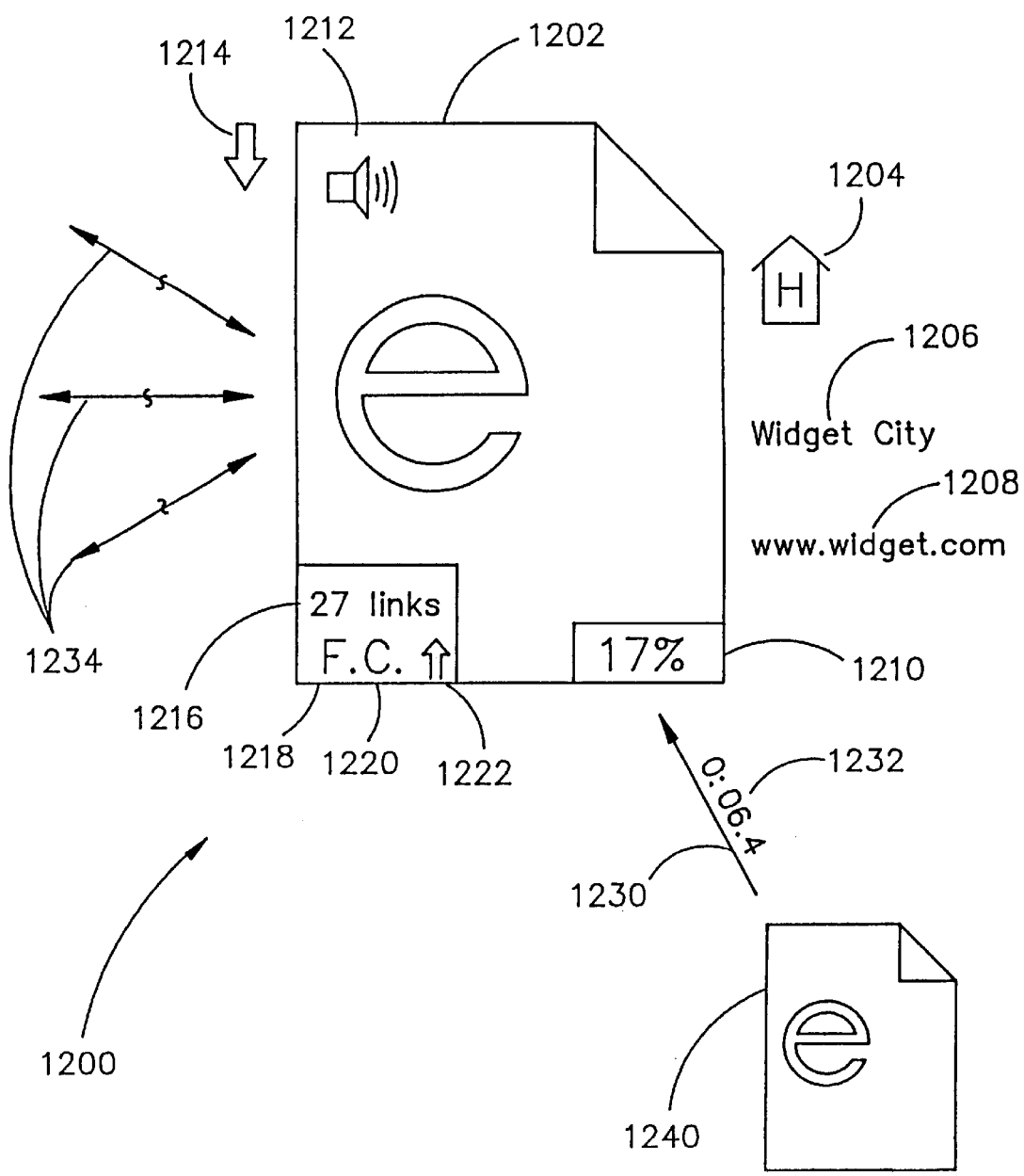
FIG. 12 is an illustration depicting an exemplary embodiment of the present invention wherein representations are combined.

Furthermore, representations may be combined to form an additional representation to comprehensively represent an item of usage, as shown in FIG. 12. In this exemplary embodiment, a persistent usage context 1200 including web browsing is shown. A representation 1202 may be used to indicate a web page was accessed. Information regarding the web page may also be displayed by the representation 1202, such as the web page is a home page 1204, the name of the web site 1206, and the address of the site 1208. Information regarding the accessing of the item of usage may also be communicated. For example, representations indicating downloads 1214, percentage of the document downloaded 1210 may also be shown to indicate the source of the item of usage. Additionally, information pertaining to content related to the item of usage may be communicated with the use of representations. For example, that the item of usage contains a sound file 1212 and the number of links contained in the item of usage 1216 as well as to what those links pertain, such as a link to a file transfer protocol site 1218, a link to a commerce site 1220, a link to a home page 1222, etc. Furthermore, the association of that item of usage to other items of usage may be represented. In this example, an arrow 1230 including the download time 1232 of the item 1202 as accessed from another item of usage 1240 is shown. Truncated arrows 1234 may also be utilized to denote navigation from this item of usage 1202 to other items of usage.

Figure 13:
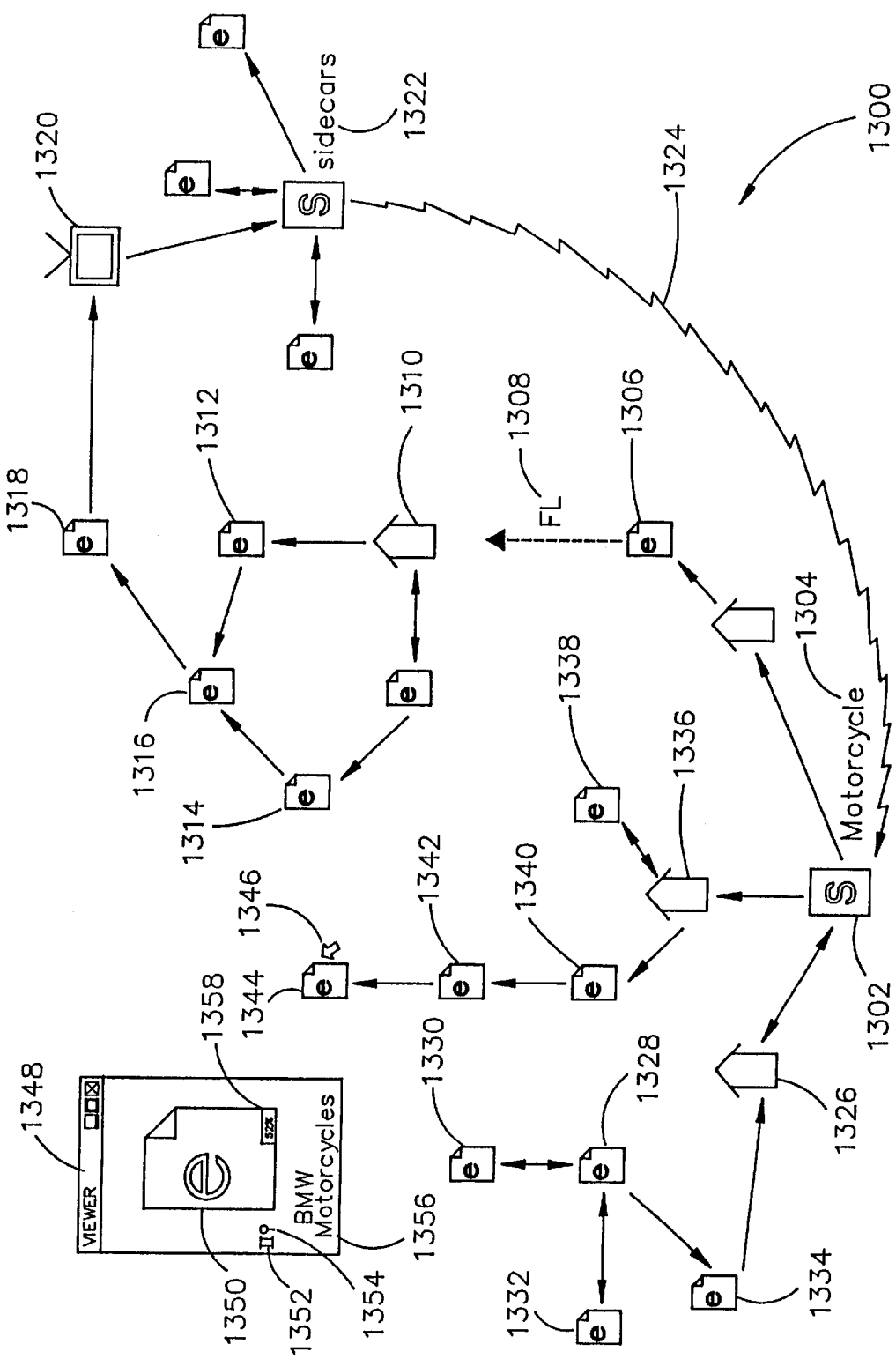
FIG. 13 is an illustration depicting an exemplary embodiment of the present invention wherein a high level organization scheme is shown.

There are a variety of display options for a persistent usage context of the present invention. For instance, usage may be communicated through the use of representations organized in a spatial relation-mapping scheme that would illustrate the course of usage both two dimensionally and three dimensionally. Additionally, levels of display may be utilized so as to enable a user to choose a high level overall view or more detailed views as the situation warrants. In one embodiment, a high level display may depict a great volume of an organizational map but each representation of an item of usage may have little detailed information. Referring now to FIG. 13, a high level organizational mapping scheme 1300 in an exemplary embodiment of the present invention is shown. In this example, a user initiates a search of the World Wide Web for information relating to motorcycles. A representation displaying that an item of usage involving a search 1302 is displayed, as well as the topic being searched 1304. After obtaining a search result, a user accesses a web site, in this case a home page 1306. If a user decided to access a site contained on a favorites list, an arrow 1308 depicting the source of the selection as well as the association of the sites may be shown. After accessing a home page 1310, the user may access a plurality of sites, two of which 1312 and 1314 lead to one site 1316. In this way, a user may view organizational associations that may have been difficult to determine under a chronologically based or nested display. A user may then access an additional site 1318 that contains streaming video. Once the user initiates downloading the streaming video a representation 1320 may be communicated indicating that item of usage. After accessing a web site on sidecars 1322, a user may utilize the history function to jump back to the original search results 1302. An arrow depicting the utilization of the history function 1324 may be communicated to indicate the usage. A variety of arrows may be utilized to indicate different associations, such as the use of different colors to signify the method of navigation (e.g. the use of a link could be a red line, the use of the back button could be green, the use of a bookmark could be blue, etc.).

The direction of arrows may also be utilized to indicate the progression of the utilization of a system and the association of the representations. For example, a user accessing a home page 1326 may choose to access a link contained in the home page 1326 to advance to another page 1328. Therefore an arrow depicting the order of access may be used. Additionally a user may wish to access a link contained in one site 1328 so as to access another site 1330 and return to the original site. Therefore a double sided arrow may be utilized to show both accessing another site 1332 and returning to the originating site 1328. Furthermore, a user may return to a site previously accessed. For example, a user may access a home site 1326, access another page contained in the site 1328, go to yet another page 1334 linked to the site 1328, and then return to the home page 1326. Therefore, this usage may be shown as a loop in an organization map which would more completely show the associations of the sites than over a traditional chronological map.

Additionally, in an additional embodiment of the present invention, a user may obtain detailed information regarding a representation and corresponding item of usage even in a high level organizational map. Referring again to FIG. 13, a user may view a thread of representations including a home page 1336 and a plurality of web sites and pages linked to the home page 1338, 1340 and 1342. If a user wished to determine more information regarding a particular representation, a user may position a cursor 1346 proximally to the representation 1344 to display a pop-up window 1348. The window 1348 may contain a more detailed representation which contains the representation 1350, percentage of the information downloaded 1358, title of the page 1356 and number of links contained in the representation 1352 and 1354. It may be useful to display the number of links is a symbolic format, such as displaying a group of ten links with a particular symbol 1352 and single links with another symbol 1354 similar to Roman Numerals. It should be apparent that a variety of methods may be used to display information in a representation without departing from the spirit and scope of the present invention.

Figure 14:
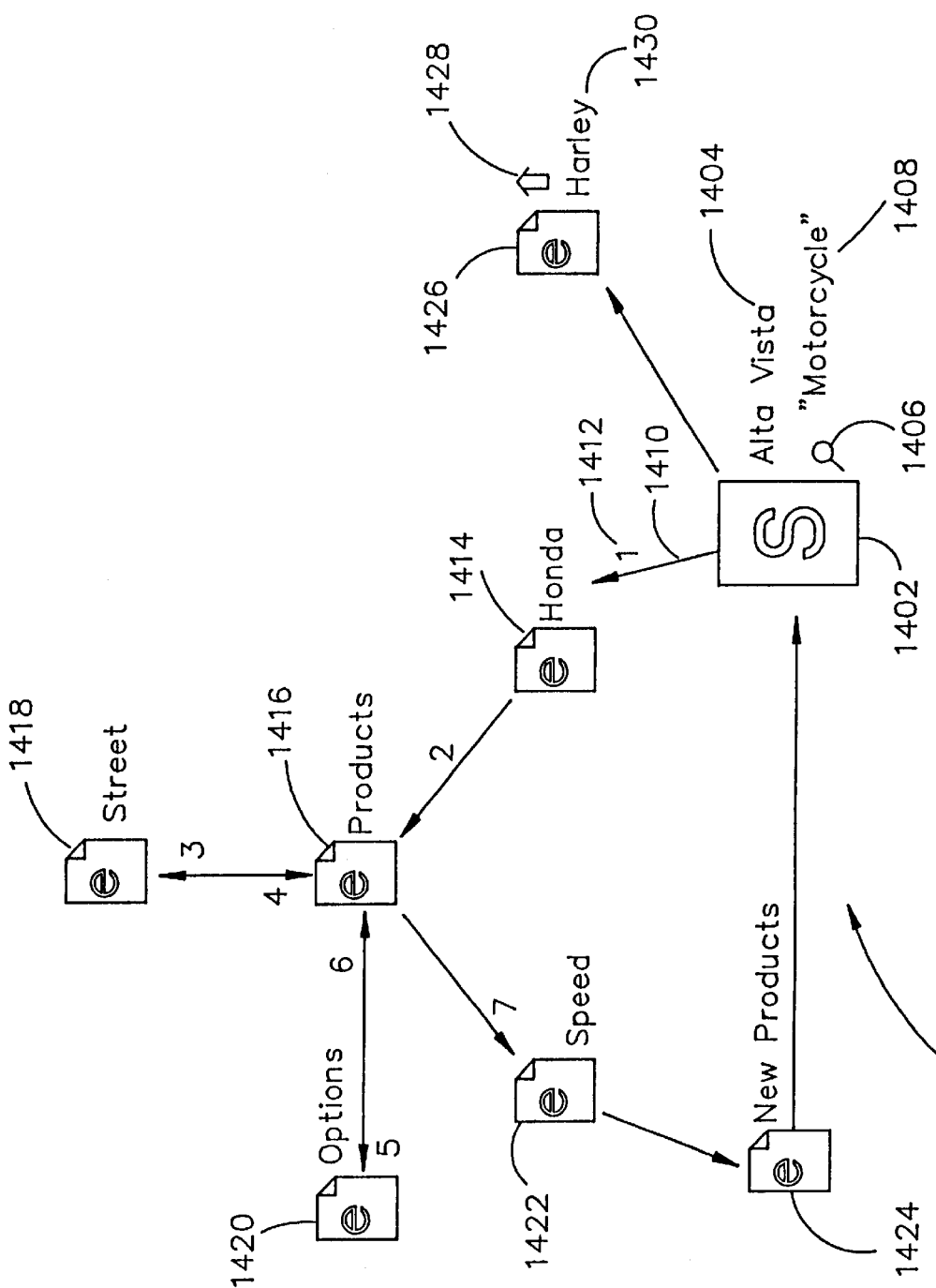
FIG. 14 is an illustration depicting an exemplary embodiment of the present invention wherein a medium level organization scheme is shown.

Referring now to FIG. 14, an exemplary embodiment of the present invention is shown wherein a medium level detail organization scheme is shown. In this example, a search over the World Wide Web is shown. A user may access a search engine, such as Alta Vista® to perform a search for motorcycles. This may be represented by a search representation 1402, displaying the search engine used 1404 along with the searched 1406 for term 1408. An arrow 1410 may be utilized to orient the user to the next representation 1414 corresponding to an item of usage and therefore show the association of the representations. It should be apparent that associations may be communicated in a variety of ways, including spatially wherein the distance of the representations from each other is utilized to depict the association, linearly to depict temporal associations, etc. The arrow 1410 may include a number 1412 to further show the order at which the items of usage were utilized. Often, a user may access an initial web page 1416 and then a linked web page 1418 and then access the initial web page again 1416. Traditionally, a history of this usage would be displayed in a chronological list depicting the initial site, the linked site, and then the initial site again. However, by utilizing the present invention a user may view the association of the sites more readily. Therefore a user accessing a plurality of linked sties and then returning to the initial site 1416, 1418, and 1420 may be readily displayed. Additionally, a user accessing a plurality of sites and then returning to one of the sites from the later accessed site may be displayed as a loop by utilizing the organization scheme of the present invention. For example, a user may access a plurality of linked sites, such as a Honda site 1414, a products site 1416 a speed site 1422, a new products site 1424 and then return to the original search site 1402. By displaying the sites as a loop, a user may determine the overall structure and therefore the association of the sites. This may be useful to show the progression of a search, patterns of access in a web site, the overall format of a resource, etc.

Figure 15:
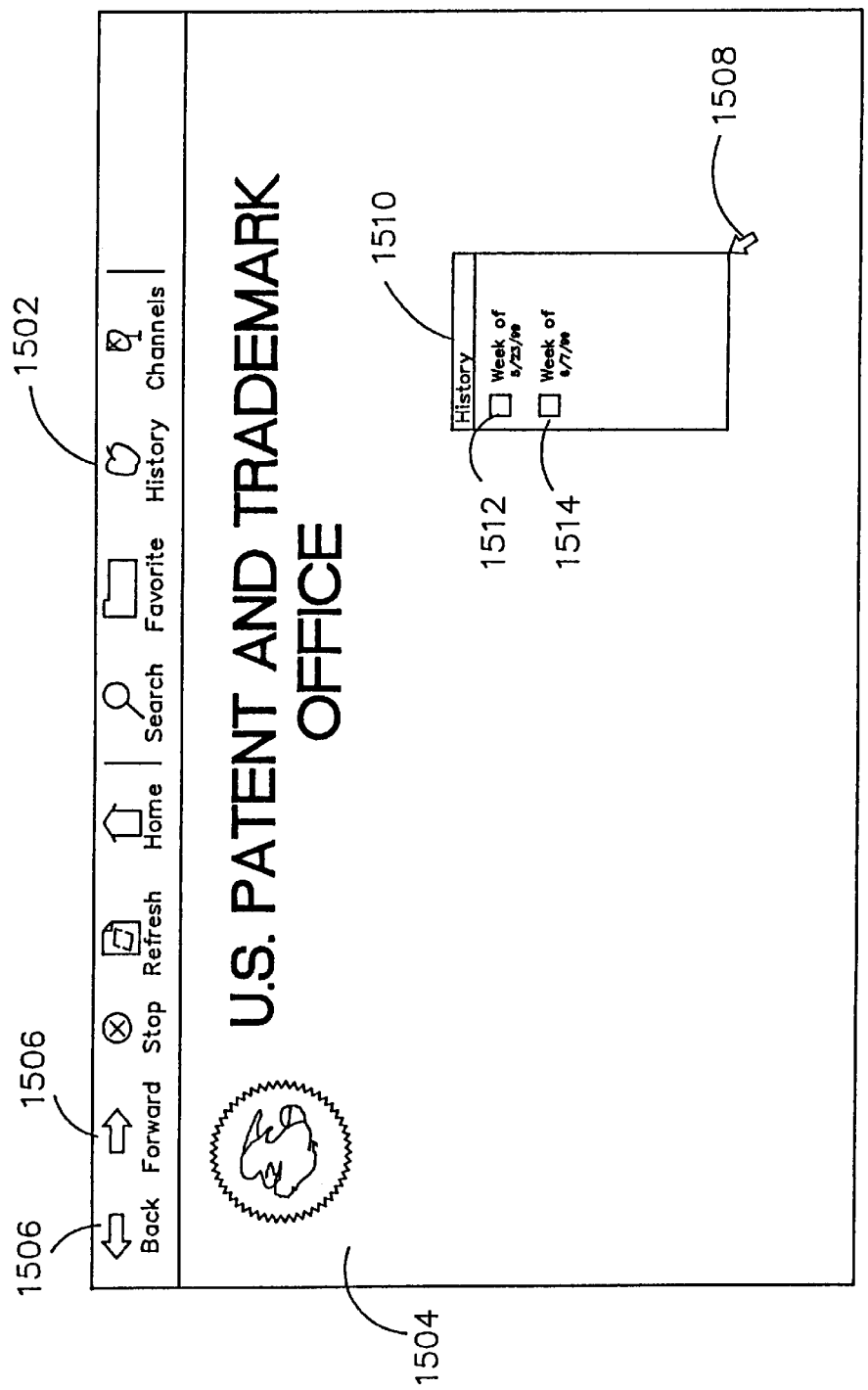
FIG. 15 is an illustration depicting an additional exemplary embodiment of the present invention wherein previous navigation data may be utilized in a current navigation session.

Referring now to FIG. 15, an additional exemplary embodiment of the present invention is shown wherein a persistent usage context 1500 may be utilized to reinstall past usage into a web browser. Traditionally, a web browser 1502 may keep a history of web sites accessed 1504 so a user may utilize forward 1508 and backward 1506 buttons to access these previously utilized pages. However, once a user ended the browsing session the ability to access the previous sites with the use of forward 1508 and backward 1506 buttons was lost. A user was forced to utilize a history list that may have saved sites accessed, but were listed in a general order that necessitated accessing each site individually off the list. Therefore, it may be useful to utilize the present invention to load a past usage context into the web browser so a user may again utilize the forward 1508 and backward 1506 buttons as the user had done in the previous session. Furthermore, persistent usage contexts may be stored so as to enable a user to choose a particular context pertaining to a relevant time of usage. For example, a user may utilize a pop-up menu 1512 displayed proximally to a cursor 1510 initiated by a right click of a mouse. Persistent usage contexts may be displayed for a particular time frame, such as a week of usage 1514 and 1516. However, it may also be useful to enable a user to store and name persistent usage contexts corresponding to user defined criteria. For example, a user may store a particular portion of a browsing session and name the browsing session in a manner to remind the user to what it pertains. It should be apparent that a persistent usage context as previously described herein may be utilized in a wide range of applications, including the utilization of an operating system, network usage, etc. For example, it is now possible to operate an information handling system much like a web browser for applications not traditionally accessed from a web browser, such as word processing, spread sheets, and manipulation of a desktop in Windows®. By utilizing the present invention, a user may load past usage into the operating system much as the previous example for a web browser to enable a user to access previously stored actions.

Figure 16:
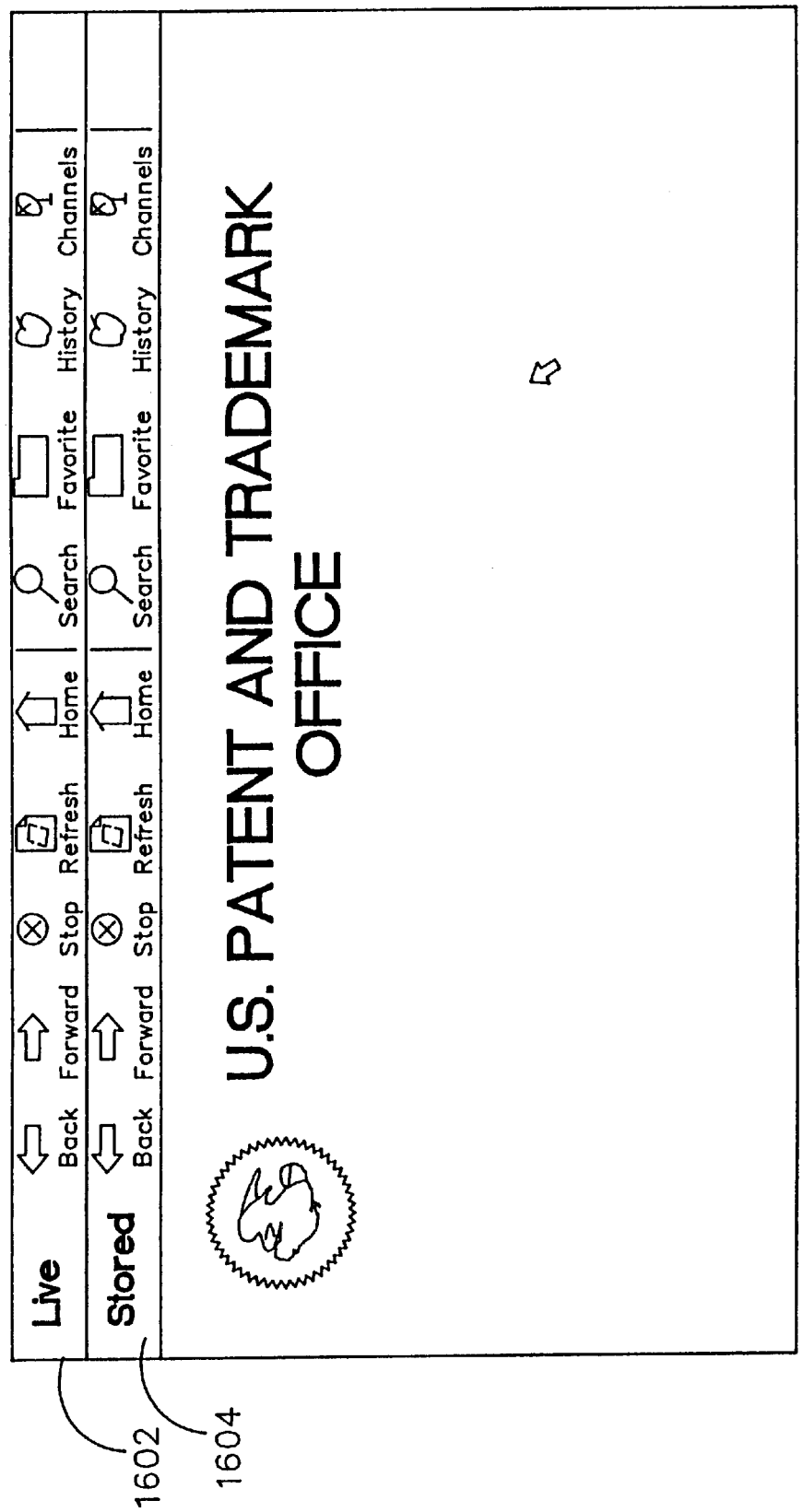
FIG. 16 is an illustration depicting an additional exemplary embodiment of the present invention wherein separate navigation bars may be utilized to access stored and live usage data.

A Web browser format may also be utilized to access both live and stored past usage, an example of which is shown in FIG. 16. In this embodiment, a persistent usage context 1600 utilizes parallel navigation bars to access "live" 1602 and "stored" 1604 versions of past usage. For example, as discussed in FIG. 3, usage may be stored on a user's information handling system. However, it may be preferable to also enable a user to access "live" versions of past usage so that the user may access and interact with past points of interest. For instance, a user may view a usage context of a Web browsing session and find a page of particular interest. If that page was not stored on the system, the user could choose to access that page over a live network connection with the use of the "live" buttons 1602. Another benefit of utilizing separate groups of buttons is that a user may wish to only access stored usage in instances where the live versions are in accessible, e.g. a network connection is not available. For example, if a user was utilizing an information handling system wherein a network connection was not available, the user may choose to use only the stored 1604 buttons to access this usage.

Figure 17:
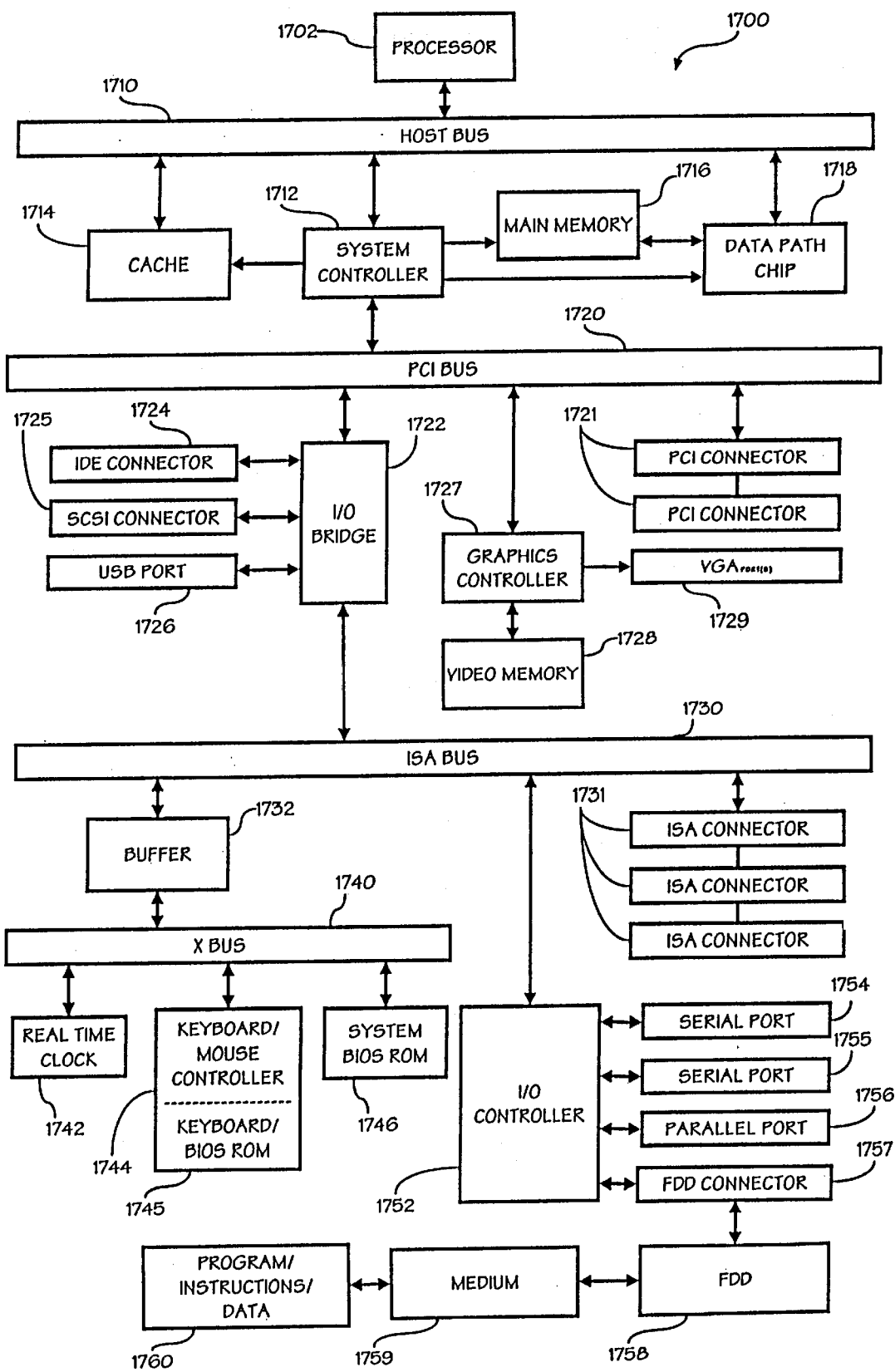
FIG. 17 is a block diagram of an information handling system operable to embody the present invention.

Referring now to FIG. 17, a block diagram of an exemplary information handling system 1700 according to the present invention is shown. In this embodiment, processor 1702, system controller 1712, cache 1714, and data-path chip 1718 are each coupled to host bus 1710. Processor 1702 is a microprocessor such as a 486-type chip, a Pentium®, Pentium II®, Pentium III® or other suitable microprocessor. Cache 1714 provides high-speed local-memory data (in one embodiment, for example, 512 KB of data) for processor 1702, and is controlled by system controller 1712, which loads cache 1714 with data that is expected to be used soon after the data is placed in cache 1712 (i.e., in the near future). Main memory 1716 is coupled between system controller 1714 and data-path chip 1718, and in one embodiment, provides random-access memory of between 17 MB and 128 MB of data. In one embodiment, main memory 1716 is provided on SIMMS (Single In-line Memory Modules), while in another embodiment, main memory 1716 is provided on DIMMs (Dual In-line Memory Modules), each of which plugs into suitable sockets provided on a motherboard holding many of the other components shown in FIG. 17. Main memory 1716 includes standard DRAM (Dynamic Random-Access Memory), EDO (Extended Data Out) DRAM, SDRAM (Synchronous DRAM), or other suitable memory technology. System controller 1712 controls PCI (Peripheral Component Interconnect) bus 1720, a local bus for system 1700 that provides a high-speed data path between processor 1702 and various peripheral devices, such as video, disk, network, etc. Data-path chip 1718 is also controlled by system controller 1712 to assist in routing data between main memory 1716, host bus 1710, and PCI bus 1720.

In one embodiment, PCI bus 1720 provides a 32-bit-wide data path that runs at 33 MHZ. In another embodiment, PCI bus 1720 provides a 64-bit-wide data path that runs at 33 MHZ. In yet other embodiments, PCI bus 1720 provides 32-bit-wide or 64-bit-wide data paths that runs at higher speeds. In one embodiment, PCI bus 1720 provides connectivity to I/O bridge 1722, graphics controller 1727, and one or more PCI connectors 1721, each of which accepts a standard PCI card. In one embodiment, I/O bridge 1722 and graphics controller 1727 are each integrated on the motherboard along with system controller 1712, in order to avoid a board-connector-board signal-crossing interface and thus provide better speed and reliability. In the embodiment shown, graphics controller 1727 is coupled to a video memory 1728 (that includes memory such as DRAM, EDO DRAM, SDRAM, or VRAM (Video Random-Access Memory)), and drives VGA (Video Graphics Adaptor) port 1729. VGA port 1729 can connect to VGA-type or SVGA (Super VGA)-type displays. Other input/output (I/O) cards having a PCI interface can be plugged into PCI connectors 1721.

In one embodiment, I/O bridge 1722 is a chip that provides connection and control to one or more independent IDE connectors 1724–1725, to a USB (Universal Serial Bus) port 1726, and to ISA (Industry Standard Architecture) bus 1730. In this embodiment, IDE connector 1724 provides connectivity for up to two standard IDE-type devices such as hard disk drives, CDROM (Compact Disk-Read-Only Memory) drives, DVD (Digital Video Disk) drives, or TBU (Tape-Backup Unit) devices. In one similar embodiment, two IDE connectors 1724 are provided, and each provide the EIDE (Enhanced IDE) architecture. In the embodiment shown, SCSI (Small Computer System Interface) connector 1725 provides connectivity for up to seven or fifteen SCSI-type devices (depending on the version of SCSI supported by the embodiment). In one embodiment, I/O bridge 1722 provides ISA bus 1730 having one or more ISA connectors 1731 (in one embodiment, three connectors are provided). In one embodiment, ISA bus 1030 is coupled to I/O controller 1752, which in turn provides connections to two serial ports 1754 and 1755, parallel port 1756, and FDD (Floppy-Disk Drive) connector 1757. In one embodiment, FDD connector 1757 is connected to FDD 1758 that receives removable media (floppy diskette) 1759 on which is stored data and/or program code 1760. In one such embodiment, program code 1760 includes code that controls programmable system 1700 to perform the method described below. In another such embodiment, serial port 1754 is connectable to a computer network such as the Internet, and such network has program code 1760 that controls programmable system 1700 to perform the method described below. In one embodiment, ISA bus 1730 is connected to buffer 1732, which is connected to X bus 1740, which provides connections to real-time clock 1742, keyboard/mouse controller 1744 and keyboard BIOS ROM (Basic Input/Output System Read-Only Memory) 1045, and to system BIOS ROM 1746.

FIG. 17 shows one exemplary embodiment of the present invention, however other bus structures and memory arrangements are specifically contemplated.

In one embodiment, I/O bridge 1722 is a chip that provides connection and control to one or more independent IDE connectors 1724–1725, to a USB (Universal Serial Bus) port 1726, and to ISA (Industry Standard Architecture) bus 1730. In this embodiment, IDE connector 1724 provides connectivity for up to two standard IDE-type devices such as hard disk drives or CDROM (Compact Disk-Read-Only Memory) drives, and similarly IDE connector 1725 provides connectivity for up to two IDE-type devices. In one such embodiment, IDE connectors 1724 and 1725 each provide the EIDE (Enhanced IDE) architecture. In one embodiment, I/O bridge 1722 provides ISA bus 1730 having one or more ISA connectors 1731 (in one embodiment, three connectors are provided). In one embodiment, ISA bus 1730 is coupled to I/O controller 1752, which in turn provides connections to two serial ports 1754 and 1755, parallel port 1756, and FDD (Floppy-Disk Drive) connector 1757. In one embodiment, ISA bus 1730 is connected to buffer 1732, which is connected to X bus 1740, which provides connections to real-time clock 1742, keyboard/mouse controller 1744 and keyboard BIOS ROM (Basic Input/Output System Read-Only Memory) 1745, and to system BIOS ROM 1746.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 1716 of one or more information handling systems configured generally as described in FIG. 17. Until required by the information handling system, the set of instructions may be stored in another readable memory device, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another information handling system and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the persistent usage context of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method of generating a persistent usage context, comprising:

monitoring usage of an information handling system;

generating, within a detailed description area, a first representation corresponding to a first item of usage, a second representation corresponding to a second item of usage, and a third representation corresponding to a third item of usage; and generating, within a time range area, at least one icon representing a type of resource being utilized by the system during a selected time interval; and communicating an association of the first representation to the second representation so as to enable a determination of at least one of prior usage and current usage of the information handling system;

wherein the first and the second items of usage are related to one application, and the third item of usage is related to an other application.

2. The method as described in claim 1, further comprising storing the first representation and second representation.

3. A method of generating a persistent usage context, comprising:

monitoring usage of an information handling system;

generating, within a detailed description area, a first representation corresponding to a first item of usage and a second representation corresponding to a second item of usage;

generating, within a time range area, at least one icon representing a type of resource being utilized by the system during a selected time interval;

storing the first representation and the second representation;

communicating an association of the first representation to the second representation so as to enable a determination of at least one of prior usage and current usage of the information handling system;

wherein at least one of the first stored representation and the second stored representation may be accessed after termination of at least one of the first item of usage and the second item of usage.

4. The method as described in claim 1, wherein at least one of the first representation and second representation is capable of accessing at least one of a first item of usage and second item of usage.

5. The method as described in claim 1, wherein at least one of the first representation and second representation is interactive with at least one of the first item of usage and the second item of usage.

6. The method as described in claim 1, wherein the first representation includes as a part thereof the second representation.

7. The method as described in claim 1, wherein the association includes at least one of chronological mapping, organization scheme, spatial relationship, shared usage, and term of usage.

8. The method as described in claim 3, further comprising the step of searching data relating to at least one of the first representation and the second representation.

9. The method as described in claim 8, wherein the search is performed by at least one of type, topic, size, time taken for usage, time usage performed, user defined criteria, and name.

10. The method as described in claim 1, wherein said one application is configured for browsing the World Wide Web, and said other application is configured for at least one of printing, scanning for viruses, word processing, utilizing spreadsheets, utilizing a database, enabling an operating system, accessing a network, network applications, graphics usage, utilization of devices, and data manipulation.

11. A program of instructions storable on a medium readable by an information handling system for causing the information handling system to execute steps for a persistent usage context, the steps comprising:

monitoring usage of an information handling system;

generating, within a detailed description area, a first representation corresponding to a first item of usage, a second representation corresponding to a second item of usage, and a third representation corresponding to a third item of usage; and generating, within a time range area, at least one icon representing a type of resource being utilized by the system during a selected time interval;

communicating an association of the first representation to the second representation so as to enable a determination of at least one of prior usage and current usage of the information handling system;

wherein the first and the second items of usage are related to one application, and the third item of usage is related to an other application.

12. The program of instructions as described in claim 11, further comprising storing the first representation and second representation.

13. A program of instructions storable on a medium readable by an information handling system for causing the information handling system to execute steps for a persistent usage context, the steps comprising:

monitoring usage of an information handling system;

generating, within a detailed description area, a first representation corresponding to a first item of usage and a second representation corresponding to a second item of usage;

storing the first representation and the second representation;

generating, within a time range area, at least one icon representing a type of resource being utilized by the system during a selected time interval; and communicating an association of the first representation to the second representation so as to enable a determination of at least one of prior usage and current usage of the information handling system;

wherein at least one of the first stored representation and the second stored representation may be accessed after termination of at least one of the first item of usage and the second item of usage.

14. The program of instructions as described in claim 11, wherein at least one of the first representation and second representation is capable of accessing at least one of a first item of usage and second item of usage.

15. The program of instructions as described in claim 11, wherein at least one of the first representation and second representation is interactive with at least one of the first item of usage and the second item of usage.

16. The program of instructions as described in claim 11, wherein the first representation includes as a part thereof the second representation.

17. The program of instructions as described in claim 11, wherein the association includes at least one of chronological mapping, organization scheme, spatial relationship, shared usage, and term of usage.

18. The program of instructions as described in claim 13, further comprising the step of searching data relating to at least one of the first representation and the second representation.

19. The program of instructions as described in claim 18, wherein the search is performed by at least one of type, topic, size, time taken for usage, time usage performed, user defined criteria, and name.

20. The program of instructions as described in claim 11, wherein said one application is configured for browsing the World Wide Web, and said other application is configured for at least one of printing, scanning for viruses, word processing, utilizing spreadsheets, utilizing a database, enabling an operating system, accessing a network, network applications, graphics usage, utilization of devices, and data manipulation.

21. An information handling system for a persistent usage context, comprising:
a processor for executing a program of instructions on the information handling system;
a memory coupled to the processor for storing the program of instructions executable by said processor; and
an input and output system coupled to the processor for coupling the information handling system to a network wherein the program of instructions configures the information handling system to
monitor usage of the information handling system;
generate, within a detailed description area, a first representation corresponding to a first item of usage, a second representation corresponding to a second item of usage, and a third representation corresponding to a third item of usage;
generate, within a time range area, at least one icon representing a type of resource being utilized by the system during a selected time interval; and
communicate an association of the first representation to the second representation so as to enable a determination of at least one of prior usage and current usage of the information handling system;
wherein the first and the second items of usage are related to one application, and the third item of usage is related to an other application.

22. The information handling system as described in claim 21, further comprising storing the first representation and second representation.

23. An information handling system for persistent usage context, comprising:
a processor for executing a program of instructions on the information handling system;
a memory coupled to the processor for storing the program of instructions executable by said processor; and
an input and output system coupled to the processor for coupling the information handling system to a network wherein the program of instructions configures the information handling system to
monitor usage of the information handling system;
generate, within a detailed description area, a first representation corresponding to a first item of usage and a second representation corresponding to a second item of usage;
generate, within a time range area, at least one icon representing a type of resource being utilized by the system during selected time interval; and
communicate an association of the first representation to the second representation so as to enable a determination of at least one of prior usage and current usage of the information handling system;
wherein at least one of the first stored representation and the second stored representation may be accessed after termination of at least one of the first item of usage and the second item of usage.

24. The information handling system as described in claim 21, wherein at least one of the first representation and second representation is capable of accessing at least one of a first item of usage and second item of usage.

25. The information handling system as described in claim 21, wherein at least one of the first representation and second representation is interactive with at least one of the first item of usage and the second item of usage.

26. The information handling system as described in claim 21, wherein the first representation includes as a part thereof the second representation.

27. The information handling system as described in claim 21, wherein the association includes at least one of chronological mapping, organization scheme, spatial relationship, shared usage, and term of usage.

28. The information handling system as described in claim 23, wherein the program of instructions configures the information handling system to search data relating to at least one of the first representation and the second representation.

29. The information handling system as described in claim 28, wherein the search is performed by at least one of type, topic, size, time taken for usage, time usage performed, user defined criteria, and name.

30. The information handling system as described in claim 21, wherein said one application is configured for browsing the World Wide Web, and said other application is configured for at least one of printing, scanning for viruses, word processing, utilizing spreadsheets, utilizing a database, enabling an operating system, accessing a network, network applications, graphics usage, utilization of devices, and data manipulation.

31. An information handling system for persistent usage context, comprising:
a processor for executing a program of instructions on the information handling system;
a memory coupled to the processor for storing the program of instructions executable by said processor; and
an input and output system coupled to the processor for coupling the information handling system to a network wherein the program of instructions configures the information handling system to include
means for monitoring usage of the information handling system;
means for generating, within a detailed description area, a first representation corresponding to a first item of usage, a second representation corresponding to a second item of usage and a third representation corresponding to a third item of usage;
means for general, within a time range area, at least one icon representing a type of resource being utilized by the system during a selected time interval; and
means for communicating an association of the first representation to the second representation so as to enable a determination of at least one of prior usage and current usage of the information handling system;
wherein the first and the second items of usage are related to one application, and the third item of usage is related to an other application.

32. The information handling system as described in claim 31, further comprising means for storing the first representation and second representation.

33. An information handling system for persistent usage context, comprising:
a processor for executing a program of instructions on the information handling system;

a memory coupled to the processor for storing the program of instructions executable by said processor; and an input and output system coupled to the processor for coupling the information handling system to a network wherein the program of instructions configures the information handling system to include means for monitoring usage of the information handling system;

means for generating, within a detailed description area, a first representation corresponding to a first item of usage and a second representation corresponding to a second item of usage;

means for generating, within a time range area, at least one icon representing a type of resource being utilized by the system during a selected time interval; and means for communicating an association of the first representation to the second representation so as to enable a determination of at least one of prior usage and current usage of the information handling system;

wherein at least one of the first stored representation and the second stored representation may be accessed after termination of at least one of the first item of usage and the second item of usage.

34. The information handling system as described in claim 31, wherein at least one of the first representation and second representation is capable of accessing at least one of a first item of usage and second item of usage.

35. The information handling system as described in claim 31, wherein at least one of the first representation and second representation is interactive with at least one of the first item of usage and the second item of usage.

36. The information handling system as described in claim 31, wherein the first representation includes as a part thereof the second representation.

37. The information handling system as described in claim 31, wherein the association includes at least one of chronological mapping, organization scheme, spatial relationship, shared usage, and term of usage.

38. The information handling system as described in claim 33, wherein the program of instructions configures the information handling system to search data relating to at least one of the first representation and the second representation.

39. The information handling system as described in claim 38, wherein the search is performed by at least one of type, topic, size, time taken for usage, time usage performed, user defined criteria, and name.

40. The information handling system as described in claim 31, wherein said one application is configured for browsing the World Wide Web, and said other application is configured for at least one of printing, scanning for viruses, word processing, utilizing spreadsheets, utilizing a database, enabling an operating system, accessing a network, network applications, graphics usage, utilization of devices, and data manipulation.

41. A method of generating a persistent usage context, comprising:

monitoring navigation of a resource during a first navigation session to obtain navigation data;

storing first navigation data pertaining to the first navigation session;

initiating a second navigation session after termination of the first navigation session, the second navigation session comprising at least one of the first resource and a second resource;

loading the stored first navigation data in at least one of the first resource and second resource during the second navigation session so as to enable the utilization of the stored first navigation data during the second navigation session;

generating, within a detailed description area, a first representation associated with the first navigation session and a second representation associated with the second navigation session;

storing the first representation and the second representation; and generating, within a time range area, at least one icon representing a type of resource being utilized by the system during a selected time interval.

42. The method as described in claim 41, wherein at least one of the first resource and the second resource includes at least one of a web browser and operating system.

43. The method as described in claim 41, wherein the utilization of the stored first navigation data during the second navigation session includes at least one of a forward and backward button.

44. The method as described in claim 41, wherein the storing step includes storing the first navigation data in a format so as to be capable of being selectively accessed.

45. The method as described in claim 44, wherein the storing step includes a user defined identification.

46. The method as described in claim 41, wherein the stored first navigation data includes the utilization of navigation functions of at least one of the first resource and second resource.

47. The method as described in claim 46, wherein the navigation functions include at least one of forward button, a backward button, a favorites list, a bookmark, and a history list of resources accessed.

48. The method as described in claim 1, wherein the time range is a scrollable time range.

49. The method as described in claim 1, wherein said at least one icon is configured to be depicted in a graphic user interface (GUI).

* * * * *